(12) United States Patent  
Grube et al.

(10) Patent No.: US 10,571,892 B2  
(45) Date of Patent: Feb. 25, 2020

(54) PREFORM FABRICATION SYSTEM

(71) Applicant: The Boeing Company, Chicago, IL (US)

(72) Inventors: Robert William Grube, Edmond, WA (US); Huseyin Erdim, Seattle, WA (US); Mitchell Tyler Lee, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 15/013,161

(22) Filed: Feb. 2, 2016

(65) Prior Publication Data

US 2017/0220030 A1    Aug. 3, 2017

(51) Int. Cl.
  *G05B 19/4099*   (2006.01)
  *B33Y 10/00*    (2015.01)
  *B33Y 30/00*    (2015.01)
  *B33Y 50/00*    (2015.01)

(52) U.S. Cl.
  CPC .......... *G05B 19/4099* (2013.01); *B33Y 10/00* (2014.12); *B33Y 30/00* (2014.12); *B33Y 50/00* (2014.12); *G05B 2219/49023* (2013.01)

(58) Field of Classification Search
  CPC ............ G05B 19/4093; G05B 19/4097; G05B 2219/32099; Y02P 90/265
  See application file for complete search history.

(56) References Cited

U.S. PATENT DOCUMENTS

| | | |
|---|---|---|
| 6,001,300 A | 12/1999 | Buckley |
| 2007/0013724 A1 | 1/2007 | Swift |
| 2011/0256416 A1 | 10/2011 | Brancher et al. |
| 2012/0232857 A1* | 9/2012 | Fisker ................. B29C 33/3835 703/1 |
| 2014/0277669 A1* | 9/2014 | Nardi ................... G05B 19/042 700/103 |
| 2016/0135931 A1* | 5/2016 | Morales ................. A61C 13/34 433/213 |

(Continued)

FOREIGN PATENT DOCUMENTS

| | | |
|---|---|---|
| EP | 2778992 A1 | 9/2014 |
| EP | 2960046 A1 | 12/2015 |

OTHER PUBLICATIONS

Extended European Search Report, dated Jul. 4, 2017, regarding Application No. 16198294.7, 9 pages.

(Continued)

*Primary Examiner* — Kenneth M Lo
*Assistant Examiner* — Mohammad A Rahman
(74) *Attorney, Agent, or Firm* — Yee & Associates, P.C.

(57) ABSTRACT

An embodiment of the present disclosure provides a method and apparatus for managing a part. The method comprises identifying, by a computer system, parameters for the part. Further, the method comprises identifying, by the computer system, a number of additional parameters used in manufacturing the part from a preform. Yet further, the method comprises automatically generating, by the computer system, a preform design for the preform using the parameters for the part and the number of additional parameters, wherein the preform design enables manufacturing the preform using an additive manufacturing system in a manufacturing environment.

24 Claims, 17 Drawing Sheets

(56) References Cited

U.S. PATENT DOCUMENTS

2016/0209819 A1* 7/2016 Cudak ................... G05B 15/02
2016/0332919 A1* 11/2016 Fryska ................... C04B 35/83

OTHER PUBLICATIONS

Quan et al., "Additive Manufacturing of multi-directional preforms for composites: opportunities and challenges", Materials Today, May 1, 2015, 10 pages.

* cited by examiner

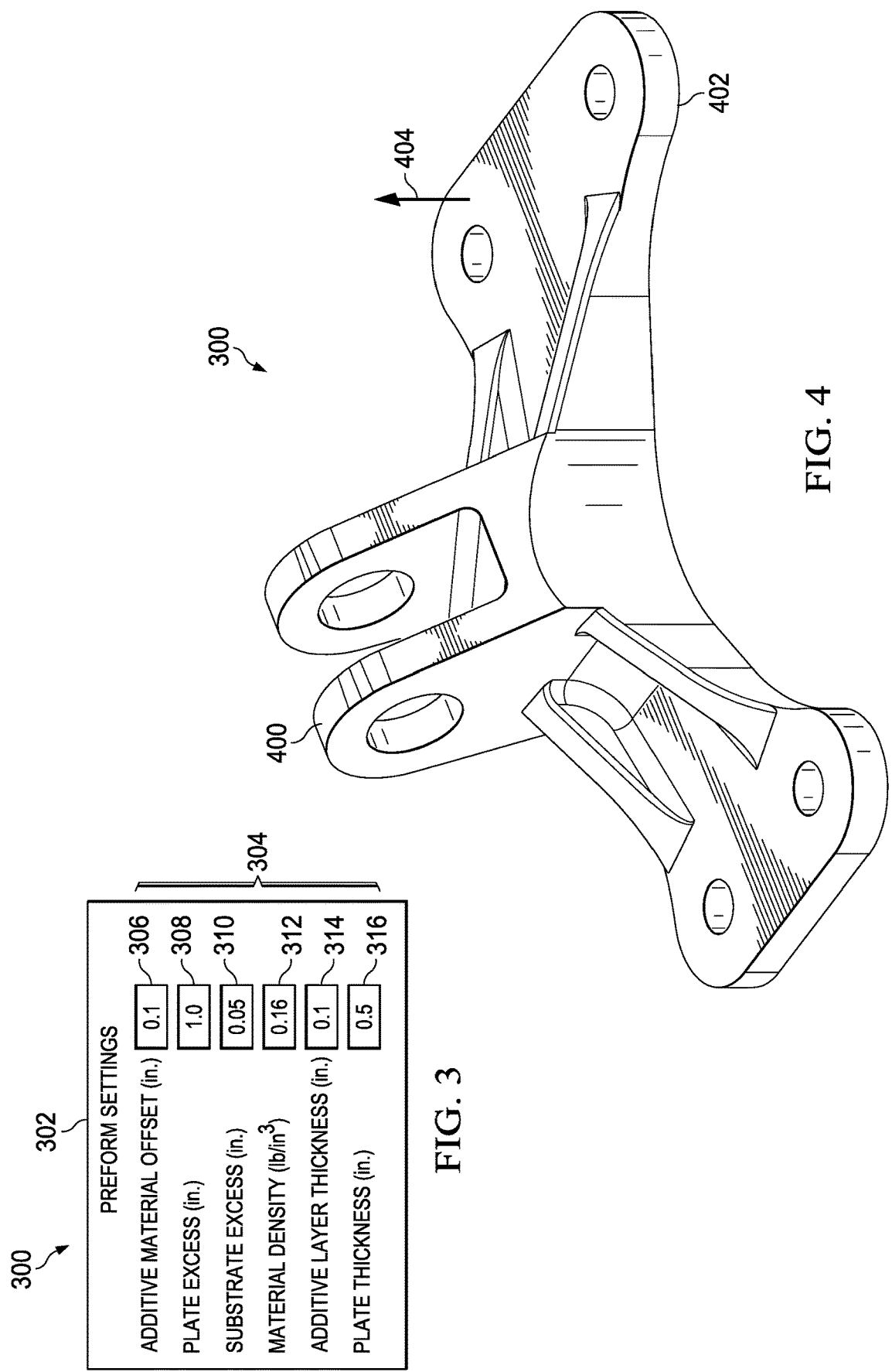

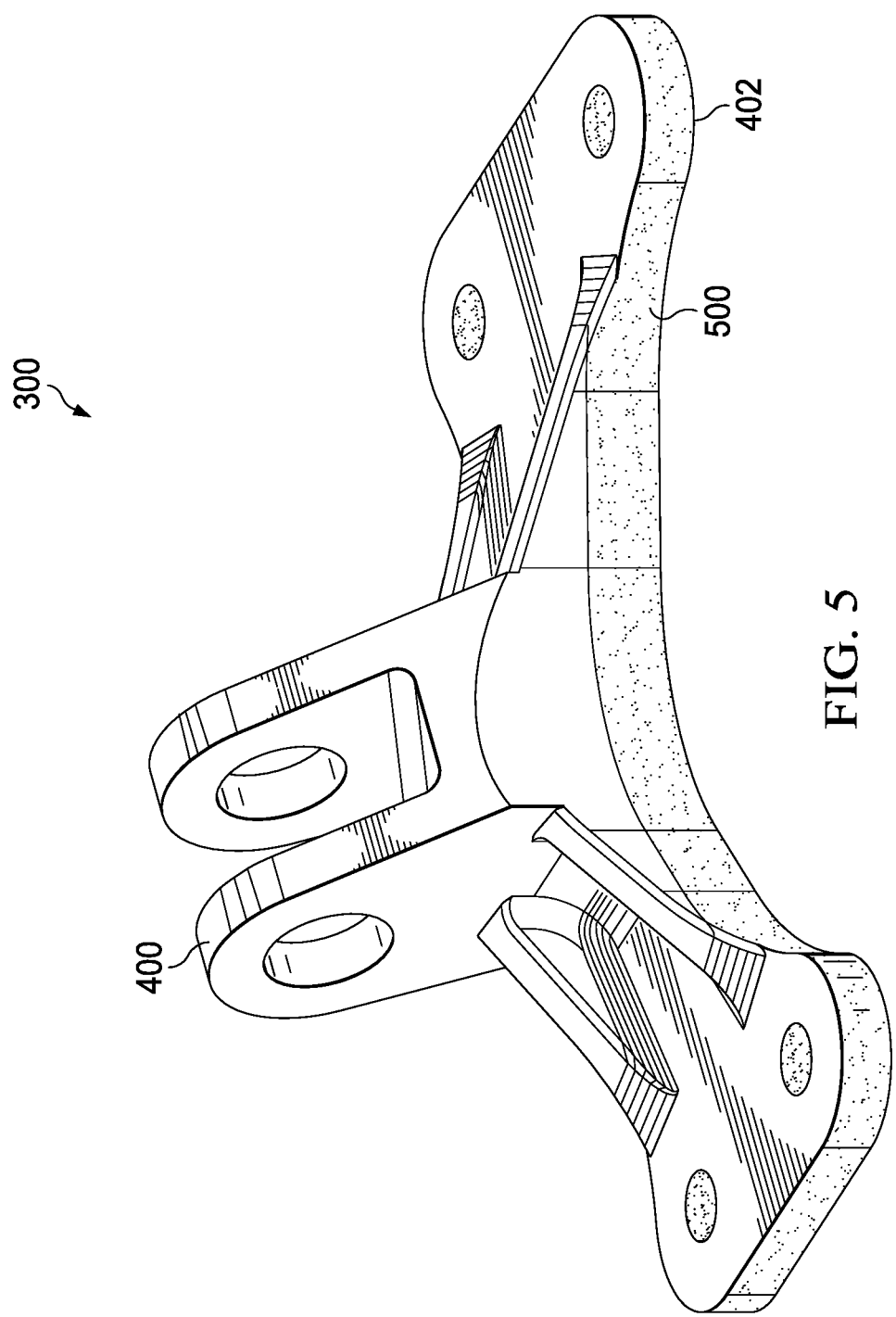

PREFORM FABRICATION SYSTEM

BACKGROUND INFORMATION

1. Field

The present disclosure relates generally to improved manufacturing and, in particular, to a method and apparatus for manufacturing a preform for a part. Still more particularly, the present disclosure relates to a method and apparatus for generating a design for manufacturing a preform for a part.

2. Background

Additive manufacturing is a process in which a three-dimensional object is formed. In additive manufacturing, successive layers of material may be formed to create an object. Objects created using additive manufacturing may be of almost any shape.

Additive manufacturing may be used for a number of different purposes. For example, additive manufacturing is used to manufacture parts or prototypes for parts that are used in objects such as aircraft, automobiles, ships, trains, machinery, medical devices, and other suitable objects.

Additive manufacturing is used to manufacture parts using materials. These materials may be, for example, metals, polymers, ceramic materials, metal alloy, titanium, thermoplastics, and other suitable types of materials.

Additive manufacturing may be performed using a number of different technologies. For example, additive manufacturing may be performed by melting or softening a material to produce layers. This type of manufacturing may include selective laser melting, direct metal laser sintering, selective laser sintering, fused deposition modeling, or other suitable techniques.

In another example, additive manufacturing may be performed using metal wire processes. For example, an electron-beam wire feed system is an additive manufacturing system that feeds wire through a nozzle. The wire fed through the nozzle is melted by an electron-beam. This type of manufacturing is referred to as electron-beam additive manufacturing (EBAM). In another example, the wire may be melted using a laser beam. This type of additive manufacturing uses electron beams or lasers, which are often used for fabricating metal parts.

The melting of the wire forms oversized layers that become a preform for the part. A preform is an object that is further processed to form the part. These oversized layers may then be machined, or otherwise processed, to form the final shape for the part.

A preform design for the preform manufactured using the wire based additive manufacturing system is based on the part design for the part. These designs are electronic files, such as computer-aided design (CAD) files. For example, a designer modifies the part design to create the preform design. Thereafter, the designer sends the preform design to manufacturers for review.

A first manufacturer reviews the preform design and provides feedback with respect to the feasibility and cost for manufacturing a preform. A second manufacturer may review the preform design to identify the feasibility of machining the preform to form the part.

The first manufacturer may consider rules that are present with respect to laying down the wire to form the preform using an additive manufacturing system. For example, locations for the substrate, the direction that the wire is laid down, how a wire can be laid on a prior wire, and other rules are present.

The second manufacturer may consider other rules for machining a preform to form the part. Depending on the type of tools used for machining the preform to form the features in the part, different amounts of excess material may be needed to form different types of parts. For example, a part with holes, groups, protrusions, or other features may require different amounts of excess material in the preform to properly form those features when machining the preform.

Additionally, the review also may include cost estimates for manufacturing the preform, manufacturing the part from the preform, or some combination thereof. The cost to manufacture the part may be based on how much material is used for the preform, the cost to create a program for the additive manufacturing system, the cost to create a program for the machining system for machining the preform to form the part, and other factors.

The manufacturers provide feedback to the designer after reviewing the preform design. The designer may make modifications to the preform design based on the feedback from the manufacturer. For example, the preform design may not be usable for manufacturing a preform. As another example, the manufacturer may return a cost estimate that may be greater than desired for manufacturing the part using the preform manufactured from the preform design. As a result, the preform design may be changed to make the preform more feasible for machining to form the part. As another example, the preform design may be changed to reduce the amount of material resulting in the cost identified for manufacturing the part being reduced. This type of design modification and review may occur several times to finalize the preform design.

The steps involved in creating the preform design, reviewing the preform design, returning feedback, and modifying the preform design as needed may be performed several times. Currently, the steps may take more time than desired in creating the preform design for the preform to manufacture a part. Additionally, the creation and modification of the preform design is subjective based on people creating the preform design and reviewing the preform design.

Therefore, it would be desirable to have a method and apparatus that take into account at least some of the issues discussed above, as well as other possible issues. For example, it would be desirable to have a method and apparatus that overcome a technical problem with the time and effort needed to create a preform design.

SUMMARY

An embodiment of the present disclosure provides an apparatus. The apparatus comprises a part manager. The part manager identifies parameters for a part. Further, the part manager identifies a number of additional parameters used in manufacturing the part from a preform. Yet further, the part manager automatically generates a preform design for the preform using the parameters for the part and the number of additional parameters, wherein the preform design enables manufacturing the preform using an additive manufacturing system.

Another embodiment of the present disclosure provides a method for managing a part. The method comprises identifying, by a computer system, parameters for the part. Further, the method comprises identifying, by the computer system, a number of additional parameters used in manufacturing the part from a preform. Yet further, the method comprises automatically generating, by the computer system, a preform design for the preform using the parameters for the part and the number of additional parameters, wherein the preform design enables manufacturing the preform using an additive manufacturing system in a manufacturing environment.

Yet another embodiment of the present disclosure provides a preform management system. The preform management system comprises a part manager. The part manager identifies parameters for a part, and identifies a number of additional parameters for manufacturing the part from a preform. Further, the part manager generates a preform design for the preform. Yet further, the part manager displays the preform design on a display system. Still further, the part manager outputs feasibility information about the preform, wherein the preform design enables manufacturing the preform using an additive manufacturing system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

FIG. 3 is an illustration of a graphical user interface for identifying additional parameters in accordance with an illustrative embodiment;

FIG. 4 is an illustration of a graphical user interface displaying a part design in accordance with an illustrative embodiment;

FIG. 5 is an illustration of the identification of a substrate in accordance with an illustrative embodiment;

DETAILED DESCRIPTION

The illustrative embodiments recognize and take into account one or more different considerations. The illustrative embodiments recognize and take into account that the current steps performed by the designer and manufacturer to create a preform design to manufacture a preform and then process the preform to form a part may not be as accurate as desired.

The illustrative embodiments recognize and take into account that this technical issue may arise from the current steps used to create preform designs. The illustrative embodiments recognize and take into account that designers often do not consider one or more of the thickness of layers formed by a particular type of additive manufacturing system, the directions for laying wires, the direction in which layers are built on the substrate, substrate locations, excess material, and other considerations that affect the amount of material needed to form a preform when creating a preform design from a part design.

The illustrative embodiments recognize and take into account that considering all of the different considerations may take more time than desired and also cost more than desired. If fewer factors are taken into account, then the feasibility and cost estimates for manufacturing a preform and then processing the preform to form a part may not be as accurate as desired.

Thus, the illustrative embodiments provide a method and apparatus for managing the part. In one illustrative example, a computer system identifies parameters for a part and identifies a number of additional parameters used in manufacturing the part from a preform. The computer system also automatically generates a preform design for the preform using the parameters for the part and the number of additional parameters, wherein the preform design enables manufacturing the preform using an additive manufacturing system in a manufacturing environment.

Figure 1:
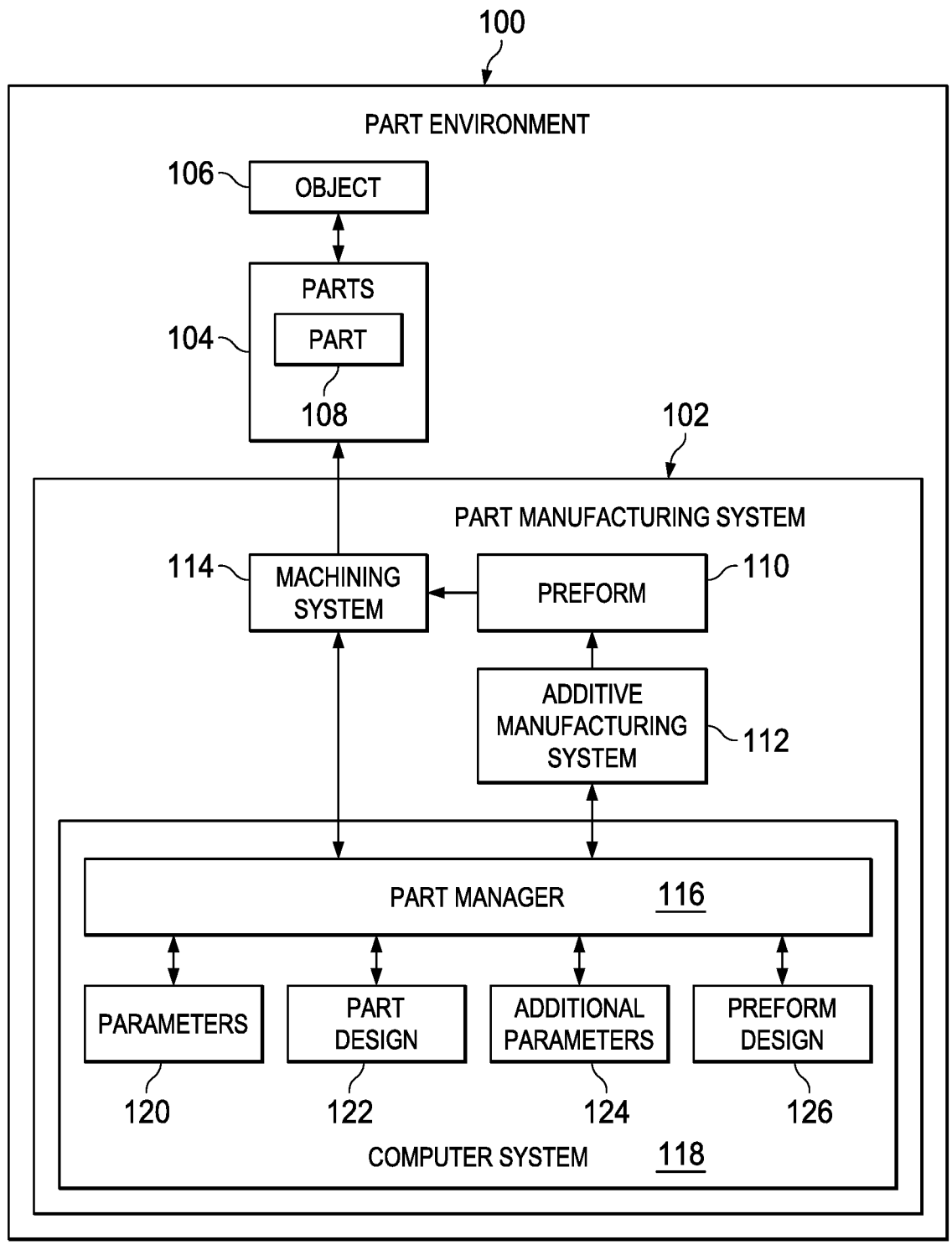
FIG. 1 is an illustration of a block diagram of a part environment in accordance with an illustrative embodiment.

With reference now to the figures and, in particular, with reference to FIG. 1, an illustration of a block diagram of a part environment is depicted in accordance with an illustrative embodiment. In this illustrative example, part environment 100 includes part manufacturing system 102 that operates to manufacture parts 104. Parts 104 may be used to manufacture object 106 or perform maintenance on object 106.

Object 106 may take a number of different forms. For example, object 106 may be selected from one of a mobile platform, a stationary platform, a land-based structure, an aquatic-based structure, or a space-based structure. More specifically, object 106 may be a surface ship, a tank, a personnel carrier, a train, a spacecraft, a space station, a satellite, a submarine, an automobile, a power plant, a bridge, a dam, a house, a manufacturing facility, a building, or other suitable objects. Object 106 may also be selected from one of an engine, an engine housing, a flap, a horizontal stabilizer, a strut, a generator, a computer, a speaker, a biomedical device, a communications device, or some other suitable object.

In this illustrative example, part 108 in parts 104 may be manufactured using preform 110. As depicted, preform 110 is manufactured by additive manufacturing system 112. Preform 110 may be processed by machining system 114 to form part 108.

Additive manufacturing system 112 includes one or more pieces of equipment that create preform 110 by forming successive layers of one or more materials. As depicted, additive manufacturing system 112 may include at least one of an electron beam additive manufacturing system, a powder based electron beam additive manufacturing system, a wire based electron beam additive manufacturing system, a laser additive manufacturing system, a selective heat sintering system, a laser sintering system, a fusion deposition modeling system, or some other suitable system that performs additive manufacturing.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

In the illustrative example, machining system 114 includes one or more pieces of equipment that remove materials from preform 110 to form part 108. As depicted, machining system 114 may be selected from at least one of a lathe, a milling machine, an electrical discharge machining system, a water jet cutting system, a laser cutting system, or some other suitable piece of equipment.

In this illustrative example, part manager 116 manages parts 104, including part 108. Part manager 116 may be implemented in software, hardware, firmware, or a combination thereof. When software is used, the operations performed by part manager 116 may be implemented in program code configured to run on hardware, such as a processor unit. When firmware is used, the operations performed by part manager 116 may be implemented in program code and data and stored in persistent memory to run on a processor unit. When hardware is employed, the hardware may include circuits that operate to perform the operations in part manager 116.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Computer system 118 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As depicted, part manager 116 identifies parameters 120 for part 108. Parameters 120 may be obtained from part design 122. Part design 122 may be a computer aided design (CAD) model, a two-dimensional model, or a three-dimensional model of part 108. Parameters 120 in part design 122 are information about part 108. For example, parameters 120 include dimensions for part 108 and may also include at least one of materials, processes, inspection information, tolerances, manufacturing excesses, finishing operations, grain direction, machining techniques, or other suitable parameters about part 108.

For example, parameters 120 may include parameters relating to machining techniques, such as waterjet, laser, thermal, or other suitable machining techniques. As another example, parameters 120 include parameters that take into account considerations for the preform that are needed to perform finishing operations, such as paint, prime anodize, or other suitable types of finishing operations.

Part manager 116 also identifies a number of additional parameters 124 used in manufacturing part 108 from preform 110. As used herein, "a number of", when used with reference to items, means one or more items. For example, a number of additional parameters 124 is one or more of additional parameters 124.

In this illustrative example, the number of additional parameters 124 is information used in creating preform design 126 for preform 110. As depicted, the number of additional parameters 124 is selected from at least one of a build direction, a substrate location, a substrate thickness, an additive material offset, a plate excess, a substrate excess, a material density, an additive layer thickness, a plate thickness, or some other suitable type of parameter.

As depicted, the number of additional parameters 124 selected and the values for the number of additional parameters 124 may be using considerations selected from at least one of considerations for forming preform 110 from preform design 126 based on the particular type of additive manufacturing system, considerations for processing preform 110 by machining system 114 to form part 108, or other suitable types of factors that may be used in creating preform design 126. Other considerations may include, for example, selections of material, costs, the manner in which material lays up to form layers, excess material needed for machining, excess material needed to handle the preform, environmental concerns, and other suitable considerations.

In this illustrative example, part manager 116 automatically generates preform design 126 for preform 110 using parameters 120 for part 108 and the number of additional parameters 124. As depicted, automatically generating preform design 126 means that part manager 116 generates preform design 126 without needing to receive user input to create preform design 126. Preform design 126 enables manufacturing preform 110 using additive manufacturing system 112.

Further, part manager 116 may manufacture preform 110 using preform design 126. In other words, part manager 116 may control the operation of additive manufacturing system 112 to manufacture preform 110 using preform design 126.

For example, part manager 116 may generate instructions for additive manufacturing system 112 using preform design 126 and the number of additional parameters 124. Preform 110 is manufactured using the instructions and additive manufacturing system 112. As depicted, the instructions are used by additive manufacturing system 112 to form preform 110 for part 108. The instructions are selected from at least one of commands, program code, source code, machine code, or some other suitable types of instructions that may be used to control additive manufacturing system 112.

After preform 110 has been manufactured using additive manufacturing system 112, part manager 116 may process preform 110 to form part 108. For example, part manager 116 may machine preform 110 to form part 108 by controlling machining system 114.

Figure 2:
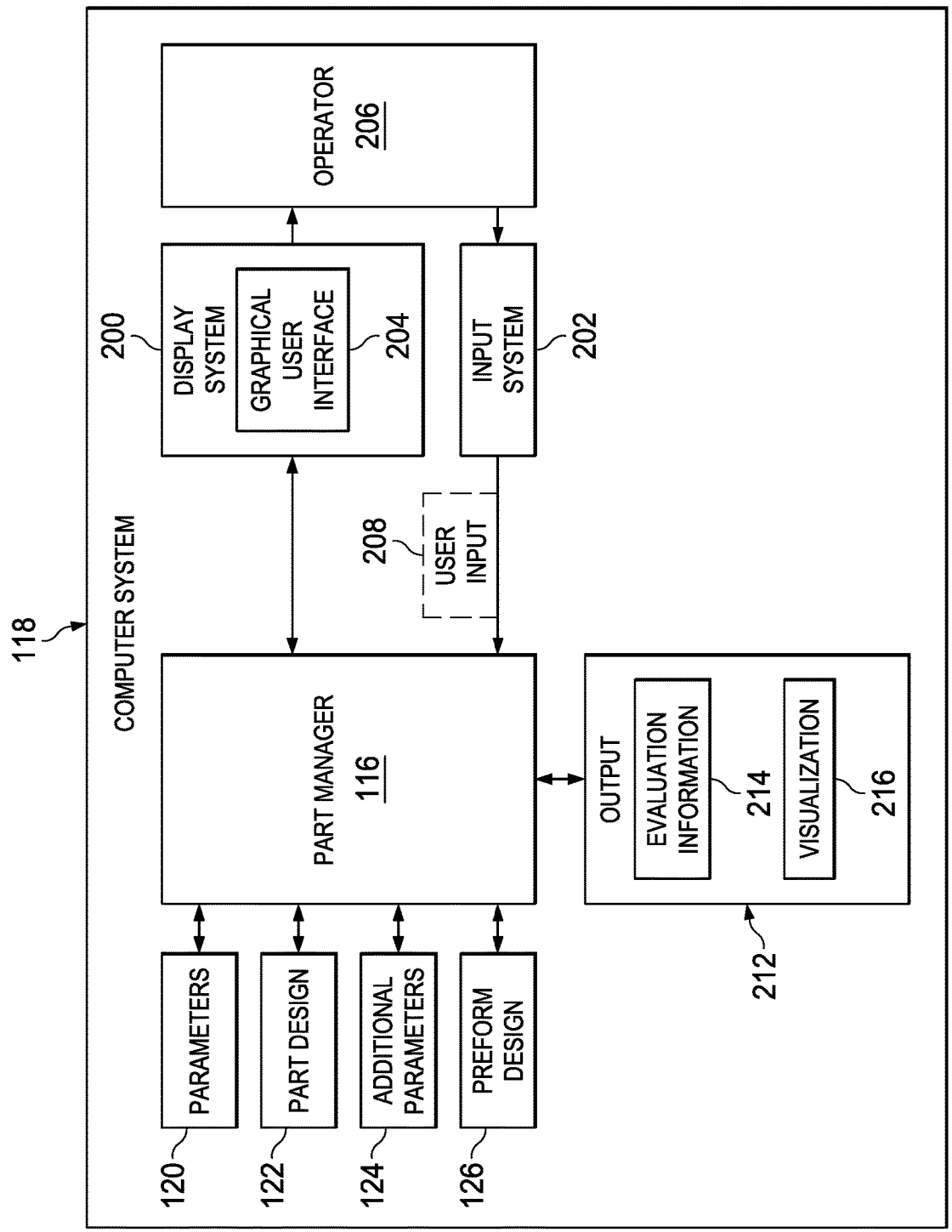
FIG. 2 is an illustration of a block diagram showing data flow in managing a part in accordance with an illustrative embodiment.

With reference now to FIG. 2, an illustration of a block diagram showing data flow in managing a part is depicted in accordance with an illustrative embodiment. In the illustrative examples, the same reference numeral may be used in more than one figure. This reuse of a reference numeral in different figures represents the same element in the different figures.

In this illustrative example, computer system 118 has display system 200 and input system 202. Display system 200 is a physical hardware system and includes one or more display devices on which graphical user interface 204 may be displayed. The display devices may include at least one of a light emitting diode (LED) display, a liquid crystal display (LCD), an organic light emitting diode (OLED) display, or some other suitable device on which graphical user interface 204 can be displayed.

Operator 206 is a person that may interact with part manager 116 via graphical user interface 204. This interaction may be through user input 208 to graphical user interface 204 generated by input system 202 in computer system 118. Input system 202 is a physical hardware system and may be selected from at least one of a mouse, a keyboard, a trackball, a touchscreen, a stylus, a motion sensing input device, a cyberglove, or some other suitable type of input device.

As depicted, part manager 116 in computer system 118 receives a selection of part design 122 for part 108 in user input 208. The selection in user input 208 may be a selection of a computer aided design (CAD) file or some other file in which part design 122 is located.

Part manager 116 uses the selection in user input 208 to identify part design 122. With the identification of part design 122, part manager 116 identifies parameters 120 for part 108 from part design 122.

Further, part manager 116 also may receive the number of additional parameters 124 as part of selection 210 in user input 208. The number of additional parameters 124 may be received directly in user input 208. In other illustrative examples, the number of additional parameters 124 may be received as the identification of a file in which the number of additional parameters 124 is located. In still other illustrative examples, the number of additional parameters 124 may be located in a default configuration file that is identified by part manager 116 without requiring the user input 208.

With the identification of parameters 120 for part 108 and the identification of additional parameters 124, part manager 116 automatically generates preform design 126. Generation of preform design 126 occurs automatically such that additional user input from operator 206 or some other operator is unnecessary to generate preform design 126. For example, preform design 126 is not made by user input 208 from operator 206 modifying part design 122 displayed in graphical user interface 204 on display system 200.

In this illustrative example, part manager 116 may repeat identifying the number of additional parameters 124 and automatically generating preform design 126 until preform design 126 meets a number of desired goals. In performing these operations, part manager 116 changes the number of additional parameters 124.

For example, values for the number of additional parameters 124 may be changed by entering values in user input 208. By changing the values, the amount of material, the time needed, or the difficulty in manufacturing preform 110 may be reduced.

Further, the particular additional parameters in the number of additional parameters 124 used may be changed. In other words, one or more different parameters may be used for the number of additional parameters 124.

Part manager 116 also may generate output 212. In this illustrative example, output 212 is information related to preform design 126. In particular, output 212 may be generated using preform design 126.

For example, output 212 may include evaluation information 214 that is used to determine whether to repeat identifying the number of additional parameters 124 and automatically generating preform design 126 with parameters 120 and changes to the number of additional parameters 124. Evaluation information 214 is generated using preform design 126. In this manner, iterations of preform design 126 may be generated until preform design 126 meets desired goals.

For example, evaluation information 214 identified by part manager 116 may include at least one of a weight for preform 110 in FIG. 1, a cost estimate for preform 110, a manufacturing time for preform 110, a machining time to form part 108 in FIG. 1 from preform 110, a type of part, or other suitable information that may be used to evaluate the feasibility of manufacturing preform 110 using preform design 126, manufacturing part 108 from preform 110, or some combination thereof.

The change to preform design 126 also may be made in response to analyzing evaluation information 214. In this illustrative example, the analysis of evaluation information 214 may be made by at least one of part manager 116, operator 206, or some other entity.

For example, if evaluation information 214 indicates that the cost estimate for manufacturing preform 110 from preform design 126 is greater than desired, the number of additional parameters 124 may be changed in an effort to reduce the cost estimate. Changes to the number of additional parameters 124 results in a change in preform design 126 that may more closely meet a number of goals for preform design 126.

As another illustrative example, output 212 also may include visualization 216. Visualization 216 is a visualization of preform design 126 that is displayed in graphical user interface 204 on display system 200. For example, preform design 126 may be displayed in graphical user interface 204 by a computer-aided design application running on computer system 118.

Visualization 216 may be viewed by operator 206 to determine whether to make changes to the number of additional parameters 124. If changes are made in the values or which parameters are used for the number of additional parameters 124, preform design 126 may be automatically generated using these changes.

In this manner, iterations of preform design 126 also may be made through visualization 216. These changes to the number of additional parameters 124 may result in a change to preform design 126 made by part manager 116.

Further, output 212 may be used for other purposes in managing part 108. For example, evaluation information 214 in output 212 may be used to manage the manufacturing of at least one of preform 110 or part 108 in FIG. 1. As another example, evaluation information 214 in output 212 may be used to determine whether preform 110 should be manufactured using additive manufacturing system 112 in FIG. 1. As yet another example, output 212 may be used to select a particular type of system in additive manufacturing system 112 to manufacture preform 110.

In one illustrative example, one or more technical solutions are present that overcome a technical problem with the time and effort needed to create a preform design. As a result, one or more technical solutions may provide a technical effect in which preform design 126 is generated automatically without requiring user input 208.

Further, the generation of preform design 126 is an improvement over currently used techniques in which human operators create preform designs using computer-aided design applications. For example, part manager 116 automatically generates part design 122 without needing user input 208 from operator 206.

As described above, one or more the illustrative examples provide a method and apparatus that overcome a technical problem with the time and effort needed to create a preform design. In the illustrative example, part manager 116 automatically generates preform design 126 from parameters 120 for part design 122 and a number of additional parameters 124 used in manufacturing preform 110.

In the illustrative example, part manager 116 allows for changes to preform design 126 to be made more quickly as compared to currently used techniques. Further, part manager 116 generates preform design 126 without needing operator 206 to modify part design 122 displayed in graphical user interface 204 to form preform design 126. By eliminating the need for this operation, preform design 126 may be generated more quickly and accurately as compared to currently used techniques.

Further, with the use of additional parameters 124 in conjunction with parameters 120 from part design 122, preform design 126 may be generated by part manager 116 in a manner that takes into account different considerations desirable for processing preform 110 manufactured by additive manufacturing system 112 in FIG. 1 to create part 108.

The illustration of part environment 100 and the different components for part environment 100 in FIG. 1 and FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, part environment 100 may omit machining system 114 in implementations in which part manufacturing system 102 manufactures preforms and not parts. As another example, part environment 100 excludes additive manufacturing system 112 and machining system 114. In this type of implementation, part manager 116 in part environment 100 may evaluate the feasibility of manufacturing preforms for parts 104 from preform designs.

With reference now to FIGS. 3-13, illustrations of a process for generating a preform design are depicted in accordance with illustrative embodiments. With reference first to FIG. 3, a graphical user interface for identifying additional parameters is depicted in accordance with an illustrative embodiment. In this figure, graphical user interface 300 displays window 302. Graphical user interface 300 is an example of one implementation for graphical user interface 204 that is displayed by part manager 116 as shown in block form in FIG. 2.

In this illustrative example, window 302 includes additional parameters 304. Additional parameters 304 may have values set through user input to graphical user interface 300. As depicted, additional parameters 304 are parameters for manufacturing a part from a preform.

In this illustrative example, additional parameters 304 include additive material offset 306, plate excess 308, substrate excess 310, material density 312, additive layer thickness 314, and plate thickness 316. These additional parameters in additional parameters 304 are selected for an electron beam additive manufacturing system that uses wire to form layers for a preform. For example, some of additional parameters 304 take into account the manner in which the substrate may be laid up to form a preform that may then be machined to form the part.

As depicted, additive material offset 306 is the amount of excess material that is needed for machining a preform to form a part. Plate excess 308 is the amount of additional material needed in the plate for tooling features. A plate is a type of substrate on which the layers may be formed through additive manufacturing.

The plate may have different shapes. For example, the plate may be square, rectangular, circular, trapezoidal, or have some other shape. The plate may be planar, curved, or have some other shape. These tooling features may include tooling holes, a flange used to hold a plate in place, and other types of features that are used in manufacturing the preform.

In this illustrative example, substrate excess 310 is the amount of material in the substrate that is needed for features that may be part of the preform. For example, the substrate may be selected to have a thickness for a base for the preform. Substrate excess 310 also may include excess material that may be machined to form features such as holes, groups, or other features for the preform.

Material density 312 is the density of the wire that is heated to form the layers for the preform. As depicted, additive layer thickness 314 is the thickness of each layer that is formed during the additive manufacturing process to manufacture the preform. In this illustrative example, plate thickness 316 is the amount of excess in the substrate that is needed for a desired plate thickness for the preform.

With reference next to FIG. 4, an illustration of a graphical user interface displaying a part design is depicted in accordance with an illustrative embodiment. In this figure, part design 400 is displayed in graphical user interface 300.

The display of part design 400 allows for a selection of facet 402 for the substrate location and build direction of the preform.

In this illustrative example, the selection may be made by user input selecting facet 402. In another illustrative example, facet 402 may be selected by part manager 116 in FIG. 1 performing an analysis on part design 400. Analysis may select the best facet in part design 400 for manufacturing a preform for the part.

The best facet may be varied, depending on the desired goal. For example, if the goal is to avoid forming layers that extend from two directions of the substrate, then the facet may be selected to avoid a preform design with features extending from both sides of the substrate.

In this illustrative example, a facet is a face on part design 400. In this illustrative example, the build direction is the direction of arrow 404 perpendicular to facet 402 on part design 400. The build direction is the direction that the layers are formed or built up on the substrate.

With reference now to FIG. 5, an illustration of the identification of a substrate is depicted in accordance with an illustrative embodiment. In this illustrative example, substrate 500 is identified as displayed in graphical user interface 300. Substrate 500 is the substrate on which layers are formed by an electron beam additive manufacturing system that uses a wire.

In this illustrative example, substrate 500 is identified using additional parameters 304 in FIG. 3. The identification of substrate 500 includes a location, as well as dimensions for substrate 500.

Further, the selected facet is used to identify a substrate. Parameters that may be used to identify the substrate include, for example, additive material offset 306 and plate thickness 316 in FIG. 3.

Figure 6:
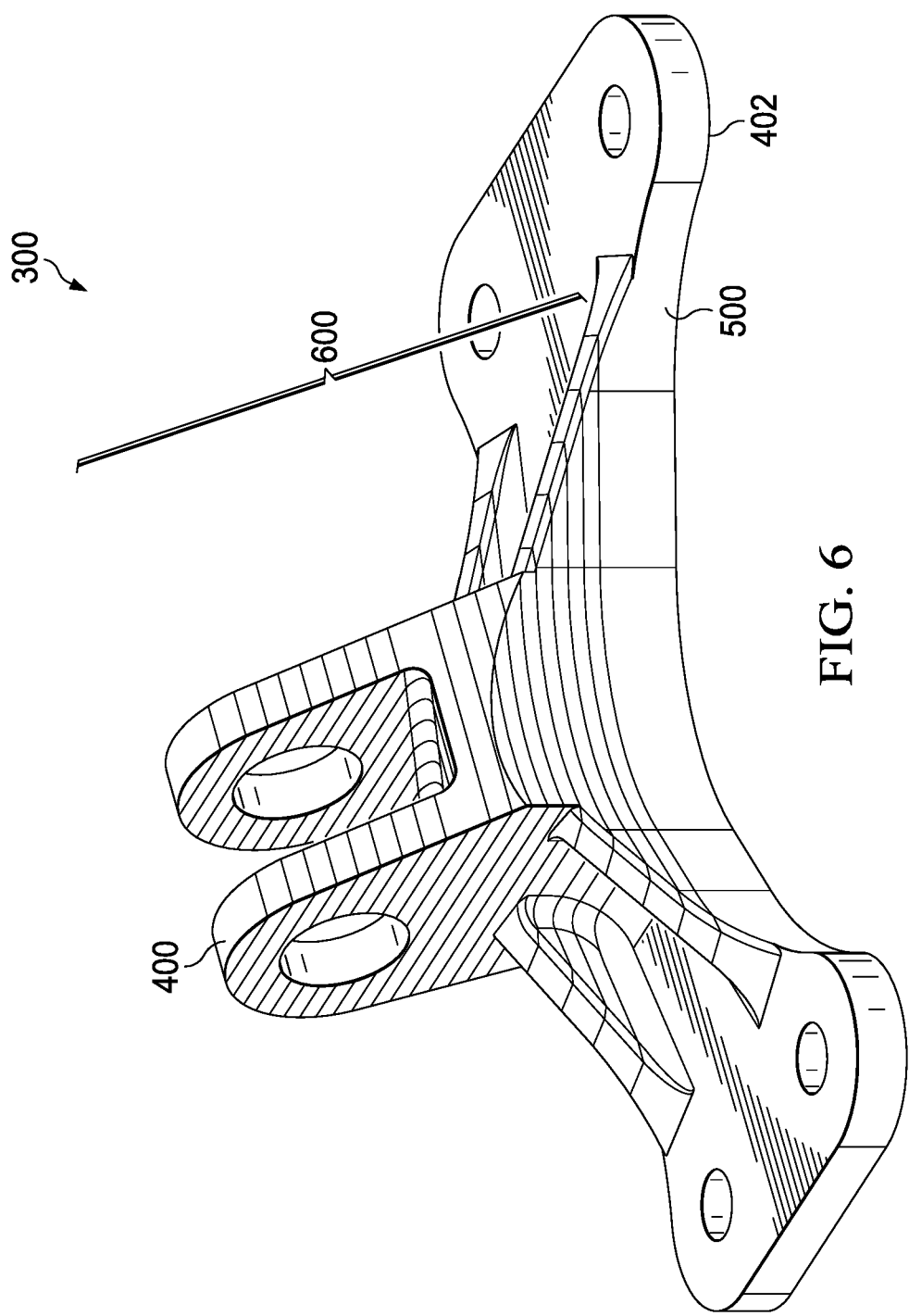
FIG. 6 is an illustration of cross-sections in accordance with an illustrative embodiment.

Turning next to FIG. 6, an illustration of cross-sections is depicted in accordance with an illustrative embodiment. In this illustrative example, part manager 116 in FIG. 1 identifies cross-sections 600 in part design 400. As depicted, cross-sections 600 are parallel to substrate 500.

The thicknesses of the cross-sections 600 are identified using additional parameters 304 in FIG. 3. For example, cross-sections 600 are identified using additive layer thickness 314 in additional parameters 304 in FIG. 3.

Figure 7:
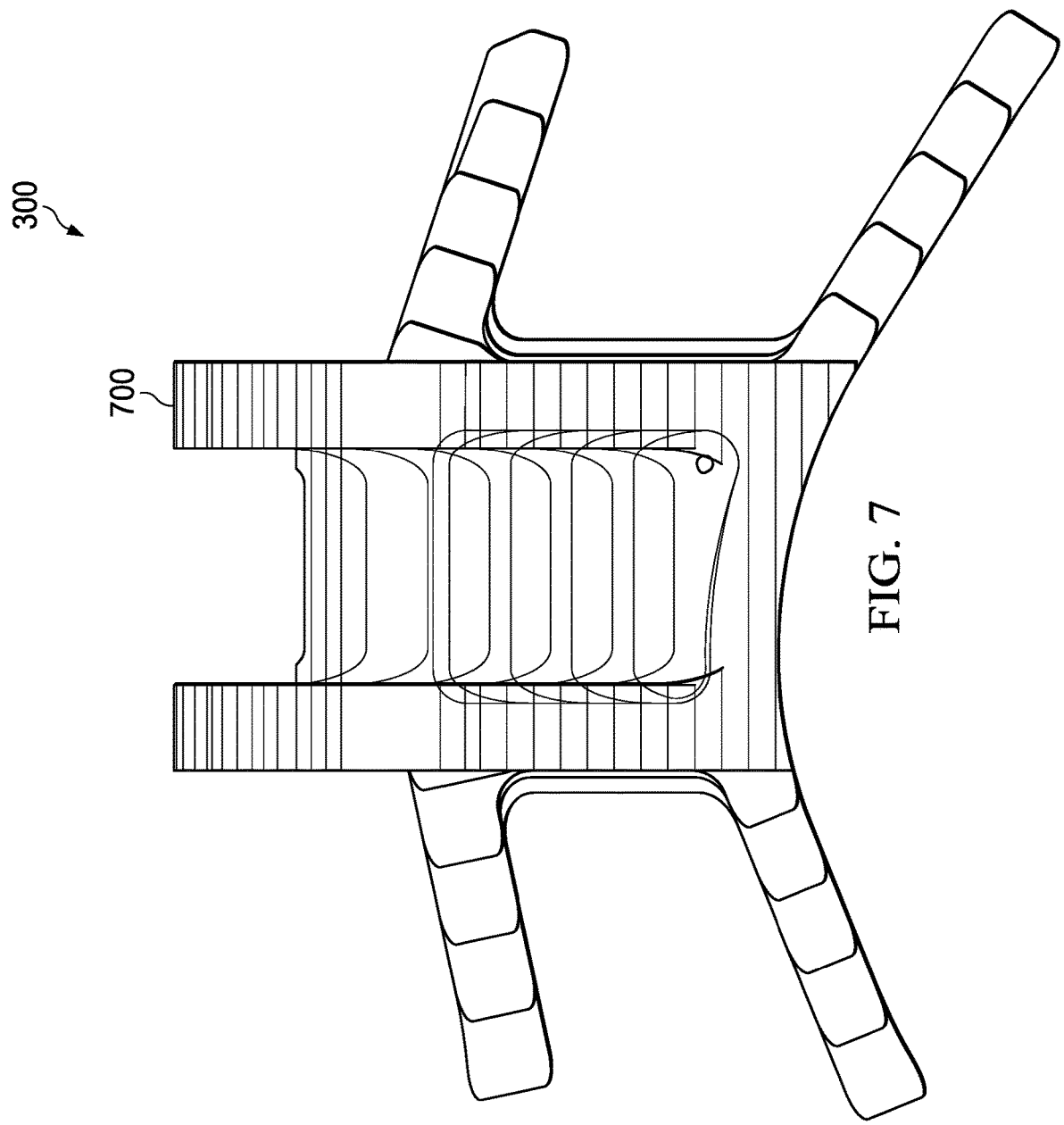
FIG. 7 is an illustration of cross-sections projected onto a substrate in accordance with an illustrative embodiment.

In FIG. 7, an illustration of cross-sections projected onto a substrate is depicted in accordance with an illustrative embodiment. As depicted, two-dimensional geometries 700 from cross-sections 600 in part design 400 in FIG. 6 are created by part manager 116 in FIG. 1 as shown in graphical user interface 300. In this example, two-dimensional geometries 700 are two-dimensional cross-sections. In this illustrative example, two-dimensional geometries 700 are created by part manager 116 from a projection of cross-sections 600 onto substrate 500.

Figure 8:
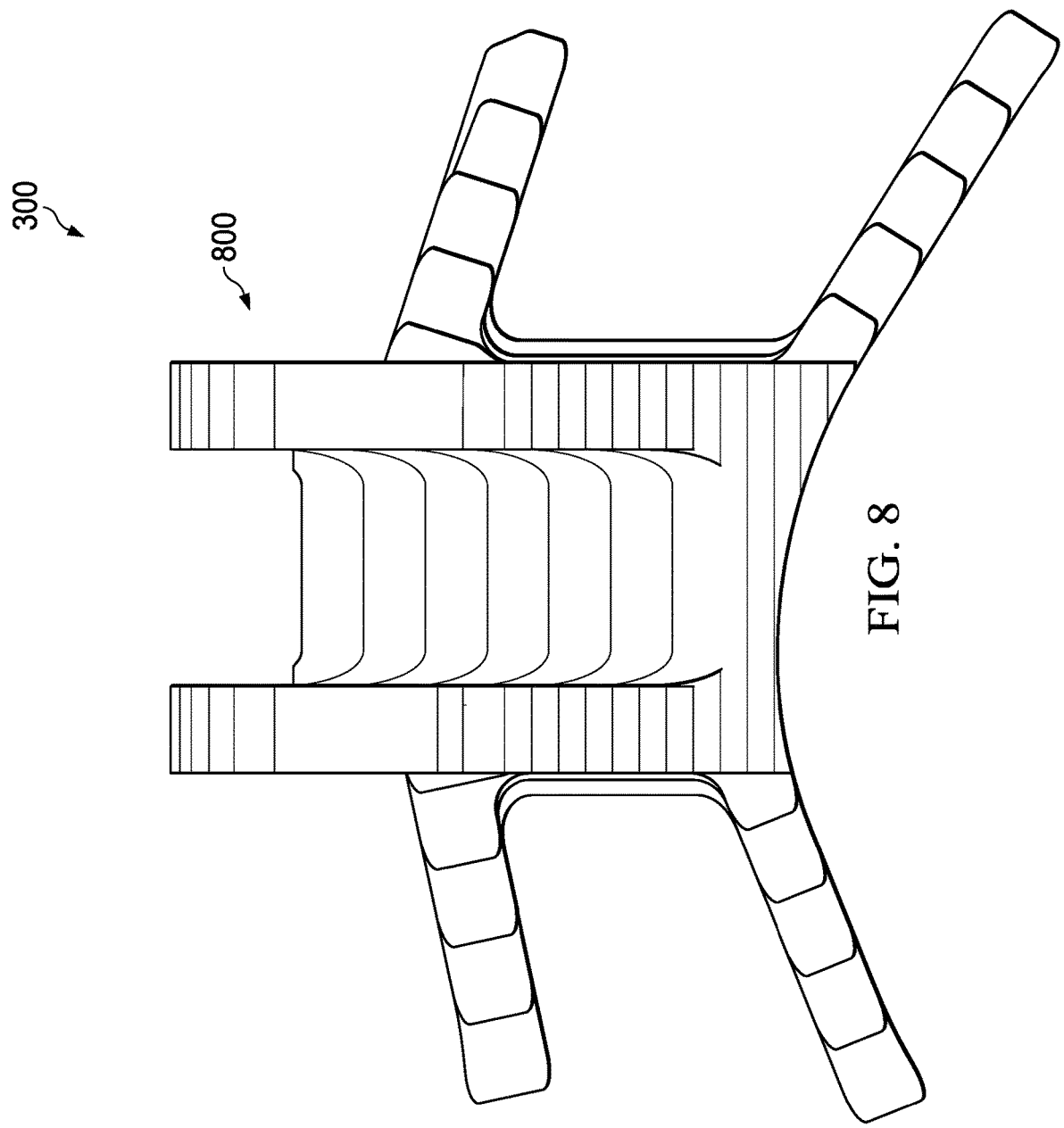
FIG. 8 is an illustration of shaded cross-sections in accordance with an illustrative embodiment.

Turning next to FIG. 8, an illustration of shaded cross-sections is depicted in accordance with an illustrative embodiment. In this figure, shaded cross-sections 800 are shown in graphical user interface 300. Shaded cross-sections 800 are created by part manager 116 in FIG. 1 from Boolean unions of two-dimensional geometries 700 in FIG. 7.

In the illustrative example, the union "C" of two regions, region "A" and region "B", is a new region where any point that was in either region "A" or region "B" or both region "A" and region "B" is in the new region "C." These two regions may be two cross-sections. Then the "shaded" region for layer "X" is a region that is the union of "X," all of the regions corresponding to layers further from the substrate as "X" and on the same side of and including "X."

Figure 9:
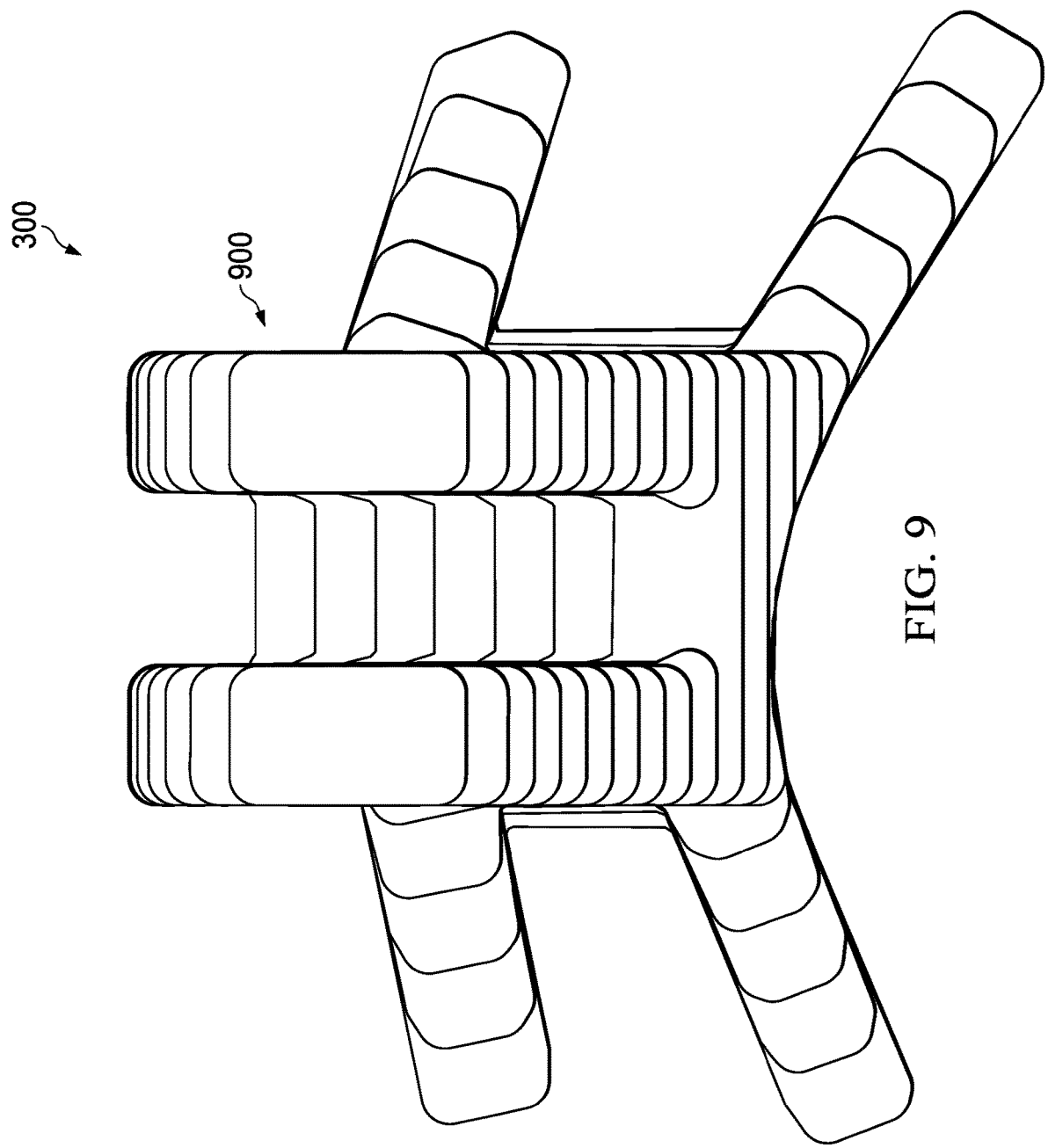
FIG. 9 is an illustration of layers for a preform design in accordance with an illustrative embodiment.

With reference now to FIG. 9, an illustration of layers for a preform design is depicted in accordance with an illustrative embodiment. As depicted, part manager 116 in FIG. 1 creates layers 900 for a preform from shaded cross-sections 800 in FIG. 8. Layers 900 include in-plane excesses. In-plane excesses are the material excesses that extend in the direction of the plane of the layers.

In the illustrative example, cross-sections are a set of curves. The set of curves are initially produced by intersecting a plane with the solid, and subsequent curve sets are generated by geometric operations. The three-dimensional cross-sections are the cross-sections having separation in the direction perpendicular to the substrate.

The two-dimensional cross-sections are formed by the projection of the three-dimensional cross sections onto the substrate plane and the subsequent in-plane curve sets generated by geometric operations. These geometric operations may be, for example, union and offset. With the two-dimensional cross-sections, all of the curves from these cross-sections are in a single plane and can be identified using two coordinates.

In the illustrative examples, layers are the solid layers in the resultant geometry. For example, the layers in the depicted example are non-substrate layers that are formed by the additive manufacturing tool.

Figure 10:
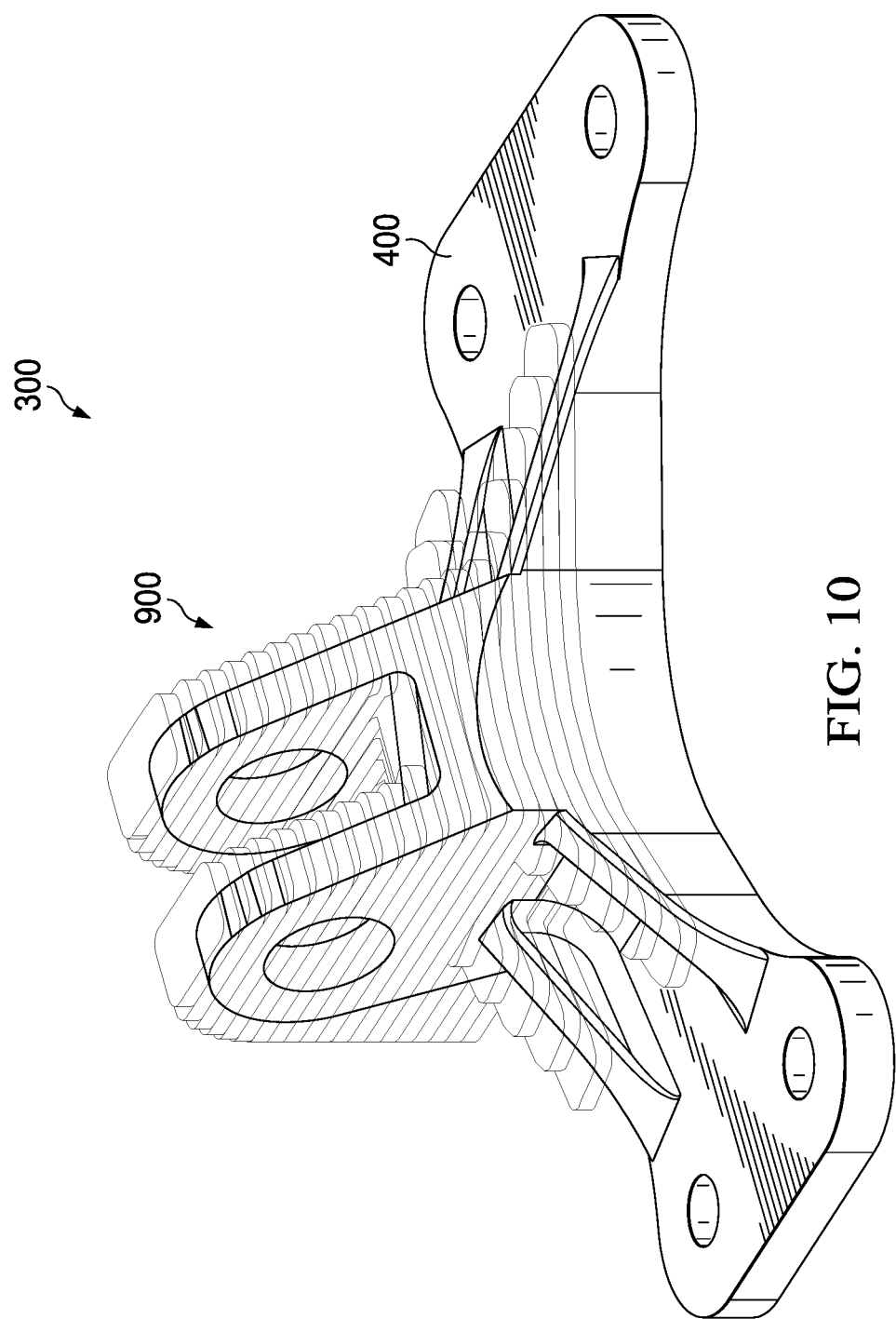
FIG. 10 is an illustration of layers for a preform on a part design in accordance with an illustrative embodiment.

Next, in FIG. 10, an illustration of layers for a preform on a part design is depicted in accordance with an illustrative embodiment. In this illustrative example, layers 900 for a preform are shown on part design 400 through an inverse of the transformation shown from FIG. 7 to FIG. 9.

Figure 11:
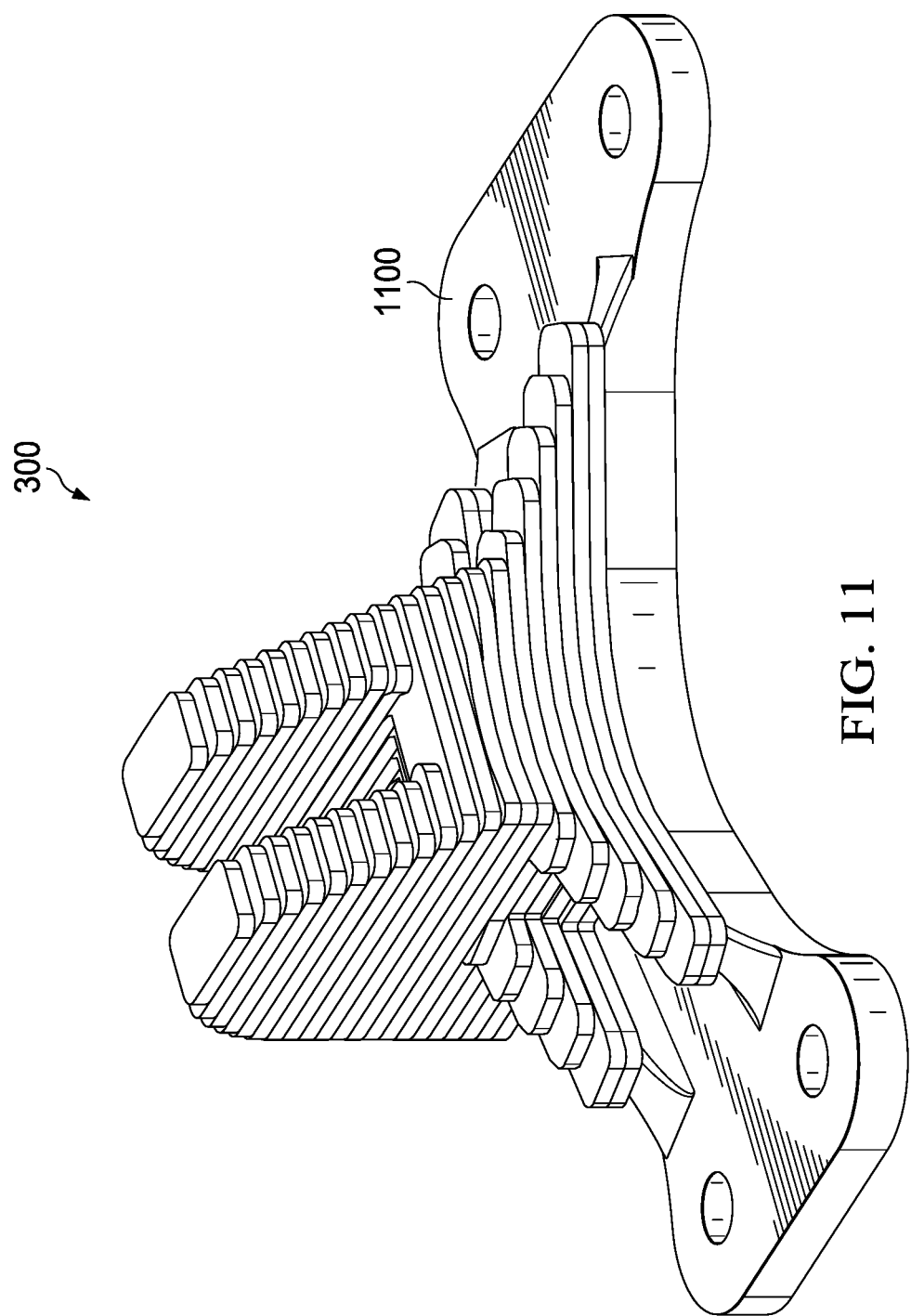
FIG. 11 is an illustration of a three-dimensional geometry in accordance with an illustrative embodiment.

Turning to FIG. 11, an illustration of a three-dimensional geometry is depicted in accordance with an illustrative embodiment. In this illustrative example, three-dimensional geometry 1100 is displayed in graphical user interface 300. Three-dimensional geometry 1100 is created using layers 900 and part design 400 in FIG. 10.

Figure 12:
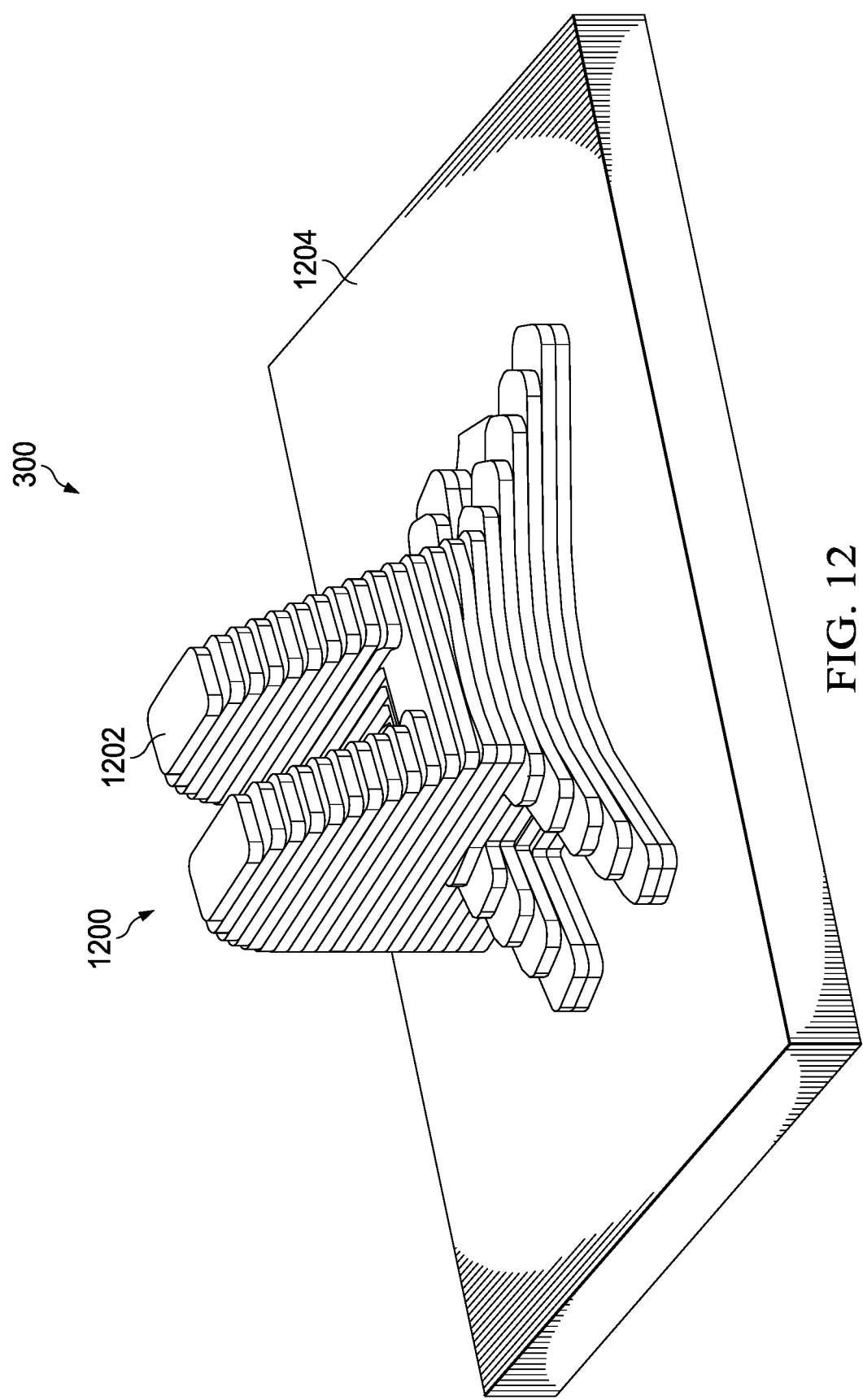
FIG. 12 is an illustration of a preform design in accordance with an illustrative embodiment.

With reference now to FIG. 12, an illustration of a preform design is depicted in accordance with an illustrative embodiment. In this illustrative example, part manager 116 in FIG. 1 creates preform design 1200 using three-dimensional geometry 1100 in FIG. 11. As depicted, preform design 1200 includes preform 1202 and substrate 1204.

Figure 13:
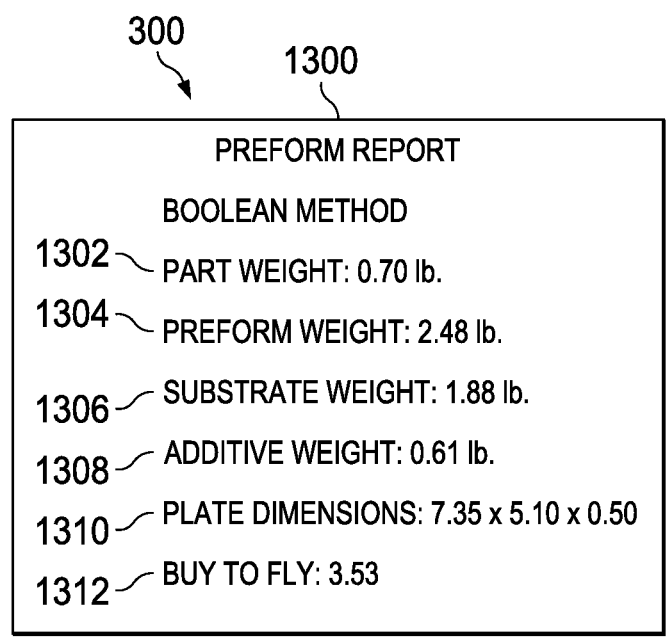
FIG. 13 is an illustration of output for evaluating a preform design in accordance with an illustrative embodiment.

Turning now to FIG. 13, an illustration of output for evaluating a preform design is depicted in accordance with an illustrative embodiment. In this illustrative example, output 1300 is an example of evaluation information 214 in FIG. 2. In this illustrative example, output 1300 is a volumetric analysis of preform design 1200. As depicted, output 1300 includes part weight 1302, preform weight 1304, substrate weight 1306, additive weight 1308, plate dimensions 1310, and buy to fly 1312.

In this illustrative example, part weight 1302 is the weight of the part corresponding to part design 400 after machining a preform manufactured using preform design 1200 in FIG. 12. Preform weight 1304 is the weight of a preform manufactured using preform design 1200. Substrate weight 1306 is the weight of the substrate on which layers are formed. Additive weight 1308 is the weight of the layers formed on the substrate.

In this illustrative example, plate dimensions 1310 are the dimensions of the substrate. Buy to fly 1312 is a metric used to define how much raw material is wasted when machining is performed on a preform to form a part. For example, if 100 pounds of titanium are used to produce a part that weighs 5 pounds, buy to fly 1312 is equal to 20.

The illustration of the graphical user interface in FIGS. 3-13 is not meant to imply limitations in the manner in which other illustrative embodiments may be implemented. For example, additional parameters 304 in FIG. 3 may change depending on the type of additive manufacturing system used. As depicted, additional parameters 304 are parameters for additive manufacturing that utilizes a wire based electron-beam additive manufacturing system. A powder based additive manufacturing system may use other types of parameters in addition to or in place of the ones illustrated in additional parameters 304.

As another example, cross-sections 600 in FIG. 6 are shown only in one direction from substrate 500. Depending on the selection of a facet, the sections may extend in two directions that are opposite to each other and perpendicular to substrate 500.

Figure 14:
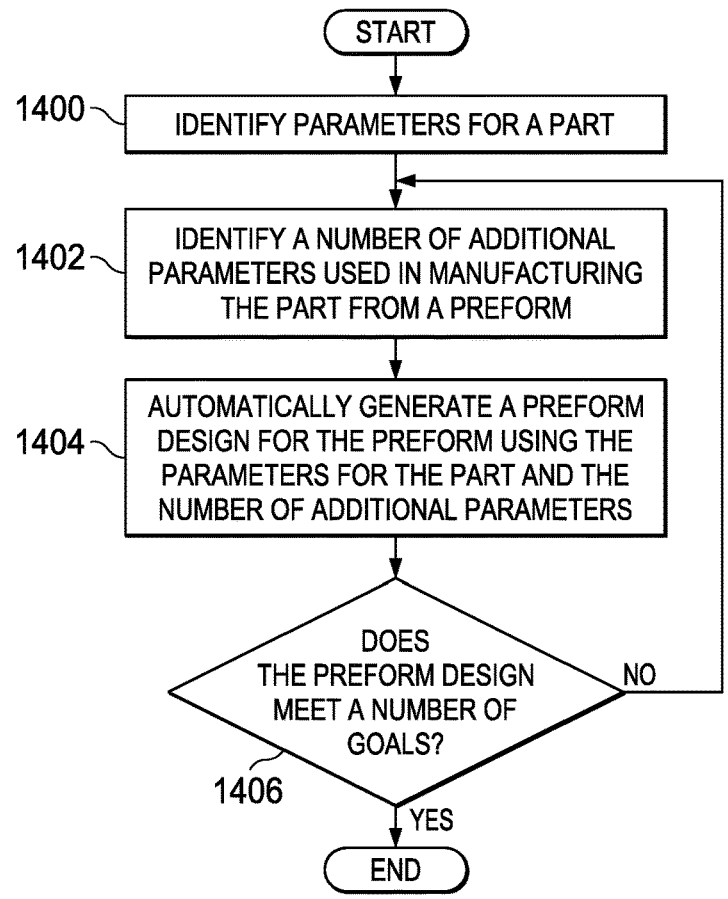
FIG. 14 is an illustration of a flowchart of a process for managing a part in accordance with an illustrative embodiment.

Turning next to FIG. 14, an illustration of a flowchart of a process for managing a part is depicted in accordance with an illustrative embodiment. The process illustrated in FIG. 14 may be implemented in part environment 100 in FIG. 1. The different operations may be implemented in part manager 116 to manage the manufacturing of preform 110 and part 108 from preform 110 in FIG. 1.

The process begins by identifying parameters for a part (operation 1400). These parameters may be obtained from a part design for the part. For example, the parameters may be located in a computer-aided design file. In other illustrative examples, these parameters may be located in a file, such as a spreadsheet or some other data structure.

The process then identifies a number of additional parameters used in manufacturing the part from a preform (operation 1402). These parameters are used with the parameters for the part to generate a preform design.

The process automatically generates a preform design for the preform using the parameters for the part and the number of additional parameters (operation 1404). The preform design enables manufacturing the preform using an additive manufacturing system in a manufacturing environment.

Next, a determination is made as to whether the preform design meets a number of goals (operation 1406). In determining whether the preform design meets a number of goals, the preform design may be evaluated using output that is related to the preform design. For example, the output may be a visualization preform design on a display system, valuation information generated for the preform design, or some other suitable information.

If the preform design meets the number of goals, the process terminates. Otherwise, the process returns to operation 1402 to identify a number of additional parameters. When the number of additional parameters is identified again, the number of additional parameters identified may be different values from the values used previously for the number of additional parameters. In another illustrative example, the number of additional parameters may need to use other types of parameters. Either the values, the type of parameters, or some combination of these two may be used to identify the number of additional parameters.

Figure 15:
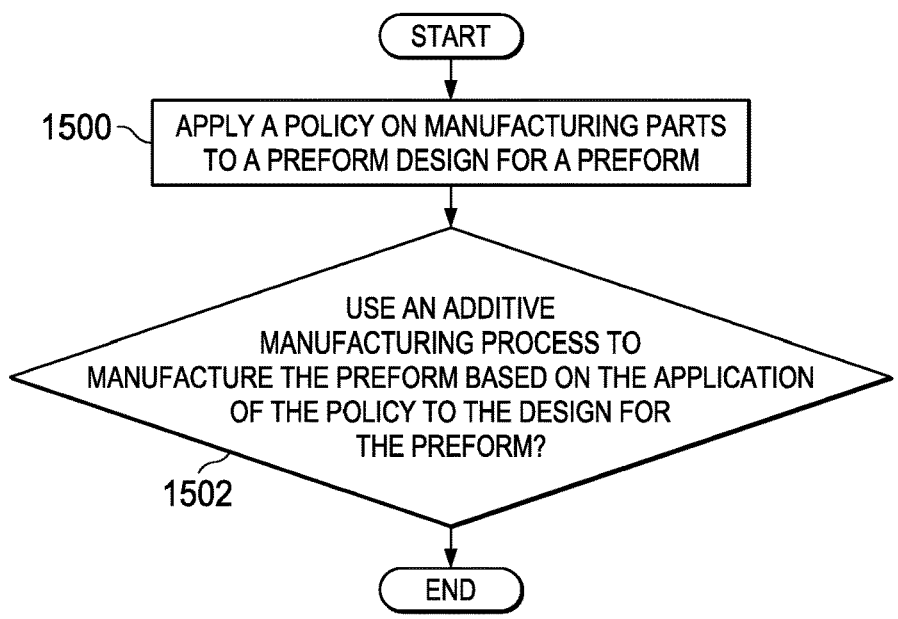
FIG. 15 is an illustration of a flowchart of a process for managing the manufacturing of a part from a preform in accordance with an illustrative embodiment.

Turning next to FIG. 15, an illustration of a flowchart of a process for managing the manufacturing of a part from a preform is depicted in accordance with an illustrative embodiment. The process begins by applying a policy on manufacturing parts to a preform design for a preform (operation 1500). The policy may be one or more rules regarding the manufacturing parts. This policy may include a number of rules relating to weight, cost, tolerances, or other suitable factors that may be used in determining whether a preform is suitable for use in manufacturing a part.

A determination is made as to whether to use an additive manufacturing process to manufacture the preform based on the application of the policy to the design for the preform (operation 1502). The process terminates thereafter.

Figure 16:
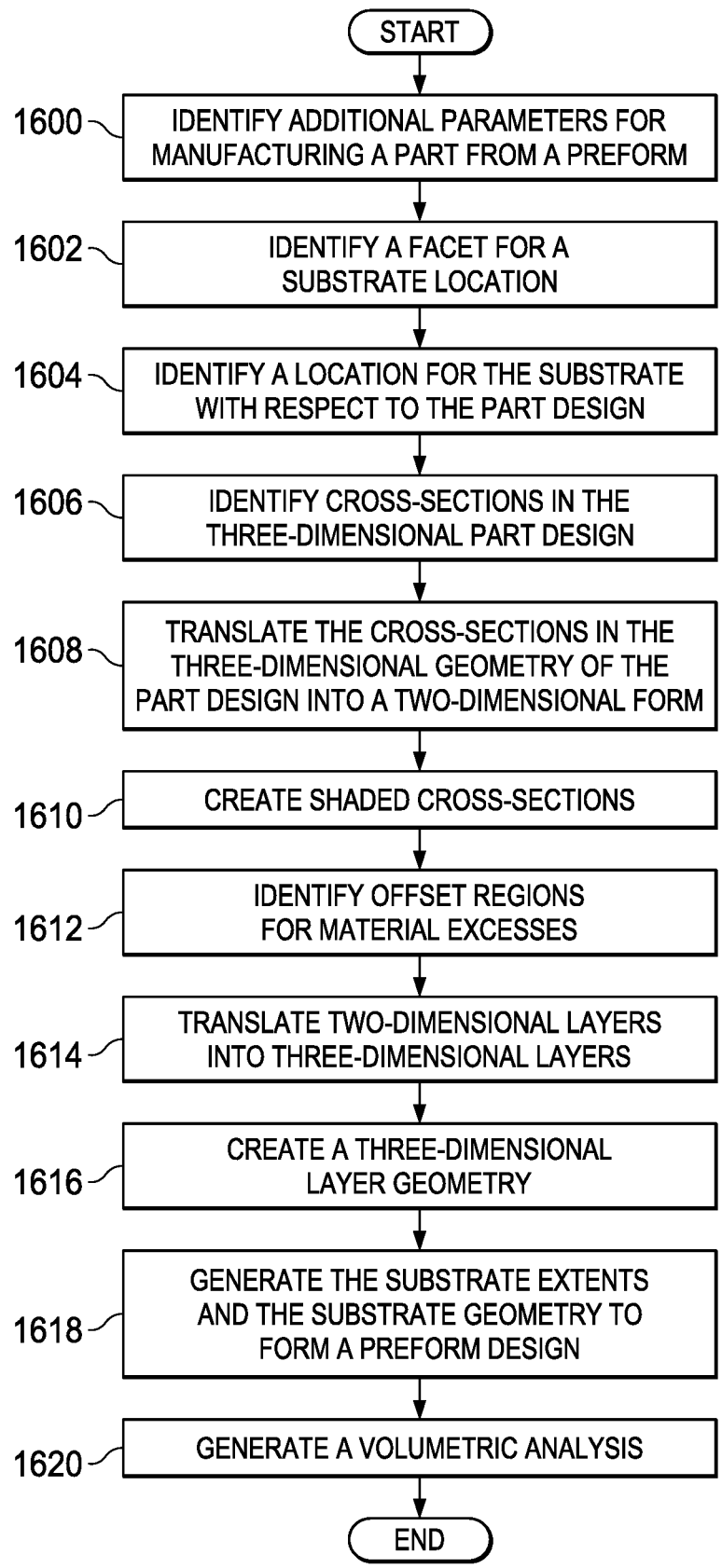
FIG. 16 is an illustration of a flowchart of a process for creating a preform design in accordance with an illustrative embodiment.

Turning now to FIG. 16, an illustration of a flowchart of a process for creating a preform design is depicted in accordance with an illustrative embodiment. The process illustrated in FIG. 16 may be implemented in part manager 116 in part environment 100 in FIG. 1. The different operations illustrated in FIG. 3 correspond to the visualizations of operations performed in FIGS. 3-13.

The process begins by identifying additional parameters for manufacturing a part from a preform (operation 1600). The additional parameters in operation 1600 are additional parameters 124 in FIG. 1. The additional parameters describe information such as offsets, excesses, or some combination thereof that are needed to machine the preform to form the part; the location and thicknesses of the substrate; material density; and other suitable information that may be needed to generate the preform design that can be processed to form a part.

The process then identifies a facet for a substrate location (operation 1602). In this illustrative example, a facet is a face or side of the preform design. The selection sets the build direction. The build direction is the direction in which layers are formed on a substrate to manufacture the preform.

For example, the facet may be selected such that the layers are formed in one direction from the substrate rather than in two directions. This selection may reduce the cost of manufacturing the preform. In the illustrative example, the facet may be identified by user input or through an analysis to identify optimal facet manufacturing a preform to meet desired goals.

The process then identifies a location for the substrate with respect to the part design (operation 1604). In this operation, cross-sections of the three-dimensional geometry for the part design are calculated such that they are parallel to the selected facet. These cross-sections are calculated starting in the plane of the facet and then moving in steps in both directions from the plane in which the facet lies. The size of the step may be set by a substrate optimality resolution parameter. The parameter defines a step size for optimal substrate location.

In this operation, cross-sections of the three-dimensional geometry for the part design are calculated such that they are parallel to the selected facet. These cross-sections are calculated starting in the plane of the facet and steps in both directions from the plane in which the facet lies. The steps are those set by the substrate optimality resolution parameter.

The larger area of the two outer cross-sections is used to determine whether the next cross section should be in the up or down direction. This process is repeated until the desired substrate thickness has been reached. In this illustrative example, the substrate thickness includes excesses.

The process then identifies cross-sections in the three-dimensional part design (operation 1606). In this illustrative example, cross-sections of the three-dimensional geometry of the part design are calculated in both directions from the plane of the facet. These cross-sections are calculated using the layer thickness as an offset for each subsequent cross-section until the cross-section is empty. As depicted, the offset is a distance from the substrate.

The process then translates the cross-sections in the three-dimensional geometry of the part design into a two-dimensional form (operation 1608). In operation 1608, all of the cross-sections are projected onto the substrate, creating cross-sections with two-dimensional geometries. For example, the three-dimensional cross-sections in FIGS. 5, 6, and 10 have separation in the direction perpendicular to the substrate.

The two-dimensional cross-sections in FIGS. 7, 8, and 9 are all in a common plane and could be described using two coordinates. Additionally, the process may also attempt to clean any inconsistencies resulting from poor three-dimensional geometry or degenerate cross-section situations.

The additive manufacturing systems receive instructions, such as programs or commands, to manufacture the preform. Due to a variety of software options, geometry specifications, file types, and computer-aided design (CAD) operator behaviors, the geometry in the geometry kernel might have inconsistencies due to inconsistencies in the geometry or in the ability of the geometric kernel to make process of the file.

As a result, inconsistencies, such as a hole or other connectivity error, may be present in the surface of the part. The hole might lead to a cross-section that does not consist of a number of closed curves. As a result, "cleaning" may be performed in an attempt to close these gaps. In these illustrative examples, the inconsistencies may include gaps, zero length curves, or other inconsistencies that may be present.

The process then creates shaded cross-sections (operation 1610). The shaded cross-sections are created using Boolean unions on the two-dimensional geometries created in operation 1608. These Boolean unions "shade" the layers farther from the substrate onto those below them. The result will be that, on either side, any cross-section will contain every cross-section that is farther than itself from the substrate.

The process then identifies offset regions for material excesses (operation 1612). In operation of 1612, the boundaries of the shaded cross-sections are adjusted by offsetting the shaded cross-sections from operation 1610 and taking into account in-plane material excesses. For example, interior openings may take into account such that the openings do not disappear during formation of the preform.

This adjustment results in two-dimensional cross-sections. These offset regions are regions in which excess material is present such that the preform may be machined to form the part. These regions of excess material also may be regions that are used by tooling in the additive manufacturing system, the machining system, or some combination thereof.

In the list of examples, the cross-sections are considered regions in which groups of points are defined by interior and exterior boundaries. For example, the offset "B" of region "A" by "X" would be the set all of points "p" such that there exists some point in region "A" whose distance from "p" is less than or equal to "X".

Next, the process translates two-dimensional layers into three-dimensional layers (operation 1614). In this operation, the process applies an inverse of the transformation from operation 1608 to the boundary in operation 1612 and offsets additionally for each layer's distance from the substrate and excess in the build direction.

The process then creates a three-dimensional layer geometry (operation 1616). In operation 1616, the process creates a cross section of the preform design by stitching together two copies of the curve or curves in operation 1614, offset by the layer thickness, and "capping" the result. For example, if a circle is present, this operation would start by creating a tube, and the "capping" would result in a closed cylinder.

The process then generates the substrate extents and the substrate geometry to form a preform design (operation 1618). In operation 1618, the process applies shading to the cross sections of the substrate from both the top and bottom layers. In this operation, the process also generates a rectangular bounding box around the layer that has as little distance as possible between the edges of the bounding box and the boundary of the layer.

In other words, the bounding box is positioned and sized to have as small of an area as possible while keeping the substrate within the bounding box. In operation 1618, the process generates the rectangular solid for the substrate using this rectangular bounding box and the locations determined in operation 1604.

The process then generates a volumetric analysis (operation 1620) with the process terminating thereafter. The biometric analysis is an example of output 212 shown in block form in FIG. 2. In operation 1620, the process aggregates the volumes of the layers in operation 1616 to calculate volume and weight of deposited material. In this operation, the process also calculates the volume of the preform and the weight of the substrate from dimensions in the material density.

With the volumetric analysis, a determination may be made as to whether the preform design meets goals in manufacturing a preform that can be machined to form the part. For example, the results of the volumetric analysis may be used for cost analysis or other suitable analysis.

If the result is not desirable, the process in FIG. 16 may be repeated using different additional parameters. For example, a different type of material may be used with the material density that may have different additive layer thicknesses or material offsets.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware.

When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, operation 1402 may be performed prior to operation 1400 in FIG. 14. In another illustrative example, operation 1620 in FIG. 16 may be omitted. In yet another illustrative example, the parameters in operation 1600 may be identified from a configuration file without requiring user input to a graphical user interface.

Figure 17:
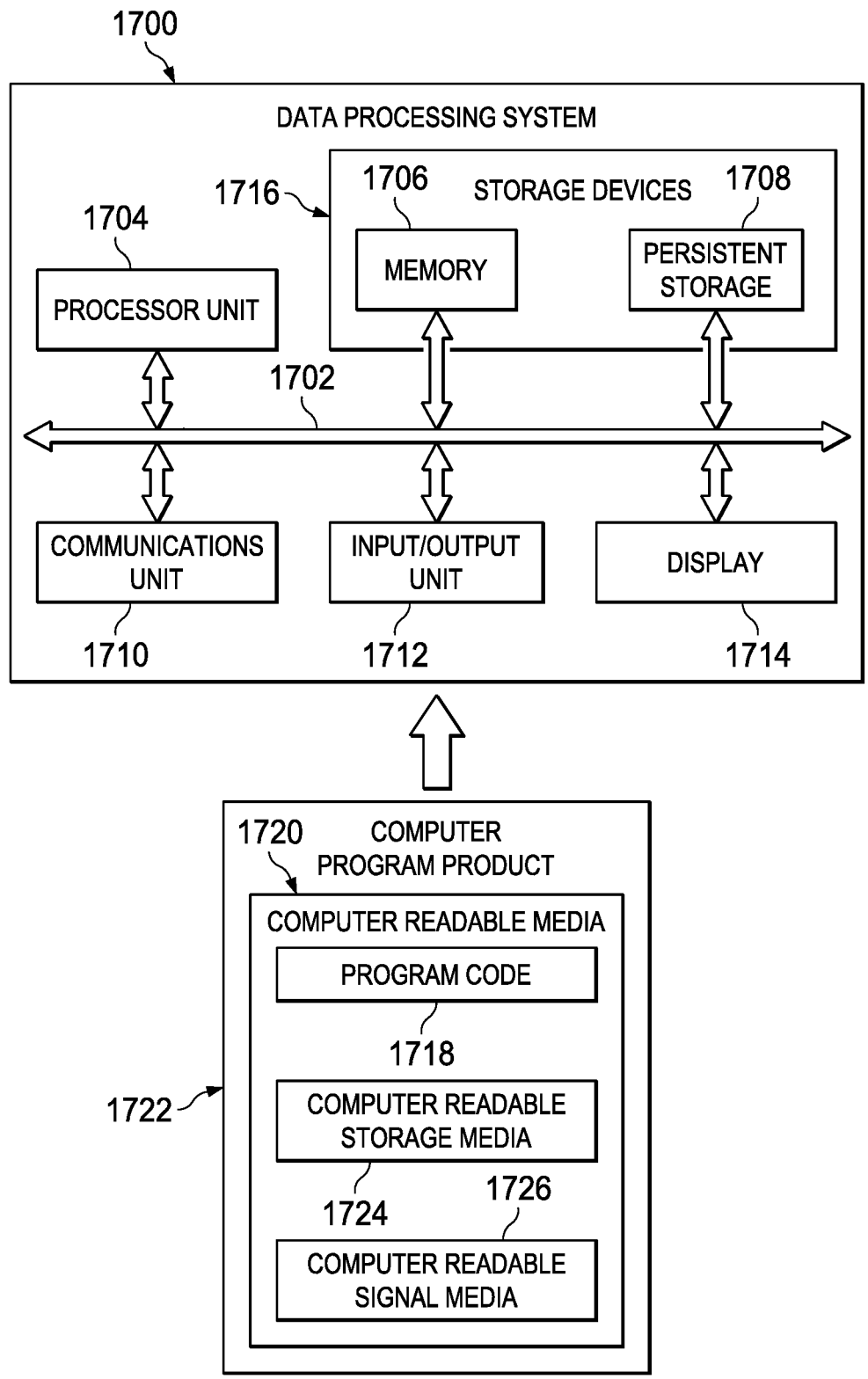
FIG. 17 is an illustration of a block diagram of a data processing system in accordance with an illustrative embodiment.

Turning now to FIG. 17, an illustration of a block diagram of a data processing system is depicted in accordance with an illustrative embodiment. Data processing system 1700 may be used to implement computer system 118 in FIG. 1 and FIG. 2. In this illustrative example, data processing system 1700 includes communications framework 1702, which provides communications between processor unit 1704, memory 1706, persistent storage 1708, communications unit 1710, input/output (I/O) unit 1712, and display 1714. In this example, communications framework 1702 may take the form of a bus system.

Processor unit 1704 serves to execute instructions for software that may be loaded into memory 1706. Processor unit 1704 may be a number of processors, a multi-processor core, or some other type of processor, depending on the particular implementation.

Memory 1706 and persistent storage 1708 are examples of storage devices 1716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1716 may also be referred to as computer readable storage devices in these illustrative examples. Memory 1706, in these examples, may be, for example, a random access memory or any other suitable volatile or non-volatile storage device. Persistent storage 1708 may take various forms, depending on the particular implementation.

For example, persistent storage 1708 may contain one or more components or devices. For example, persistent storage 1708 may be a hard drive, a solid state hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these illustrative examples, provides for communications with other data processing systems or devices. In these illustrative examples, communications unit 1710 is a network interface card.

Input/output unit 1712 allows for input and output of data with other devices that may be connected to data processing system 1700. For example, input/output unit 1712 may provide a connection for user input through at least one of a keyboard, a mouse, or some other suitable input device. Further, input/output unit 1712 may send output to a printer. Display 1714 provides a mechanism to display information to a user.

Instructions for at least one of the operating system, applications, or programs may be located in storage devices 1716, which are in communication with processor unit 1704 through communications framework 1702. The processes of the different embodiments may be performed by processor unit 1704 using computer-implemented instructions, which may be located in a memory, such as memory 1706.

These instructions are referred to as program code, computer usable program code, or computer readable program code that may be read and executed by a processor in processor unit 1704. The program code in the different embodiments may be embodied on different physical or computer readable storage media, such as memory 1706 or persistent storage 1708.

Program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these illustrative examples. In one example, computer readable media 1720 may be computer readable storage media 1724 or computer readable signal media 1726.

In these illustrative examples, computer readable storage media 1724 is a physical or tangible storage device used to store program code 1718 rather than a medium that propagates or transmits program code 1718. Alternatively, program code 1718 may be transferred to data processing system 1700 using computer readable signal media 1726. Computer readable signal media 1726 may be, for example, a propagated data signal containing program code 1718. For example, computer readable signal media 1726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700. Other components shown in FIG. 17 can be varied from the illustrative examples shown. The different embodiments may be implemented using any hardware device or system capable of running program code 1718.

Figure 18:
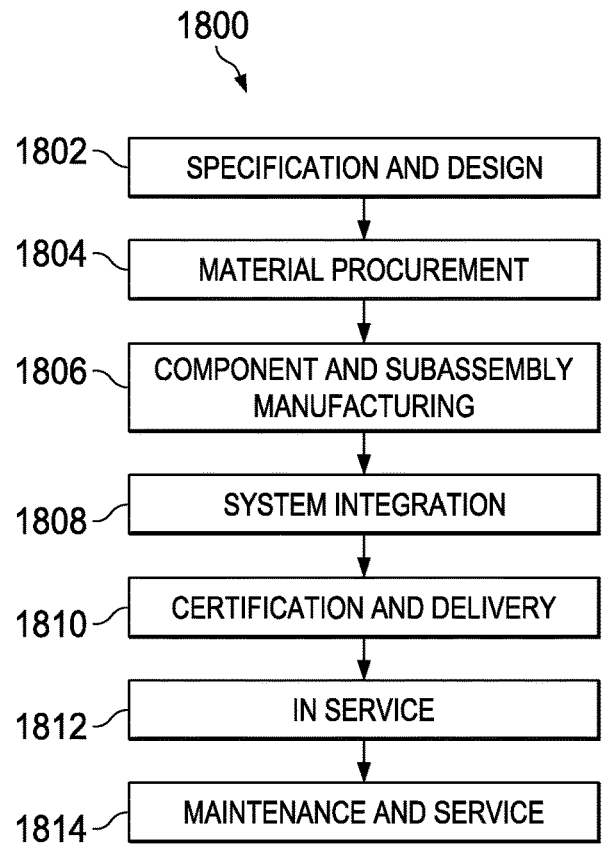
FIG. 18 is an illustration of a block diagram of an aircraft manufacturing and service method in accordance with an illustrative embodiment.
Figure 19:
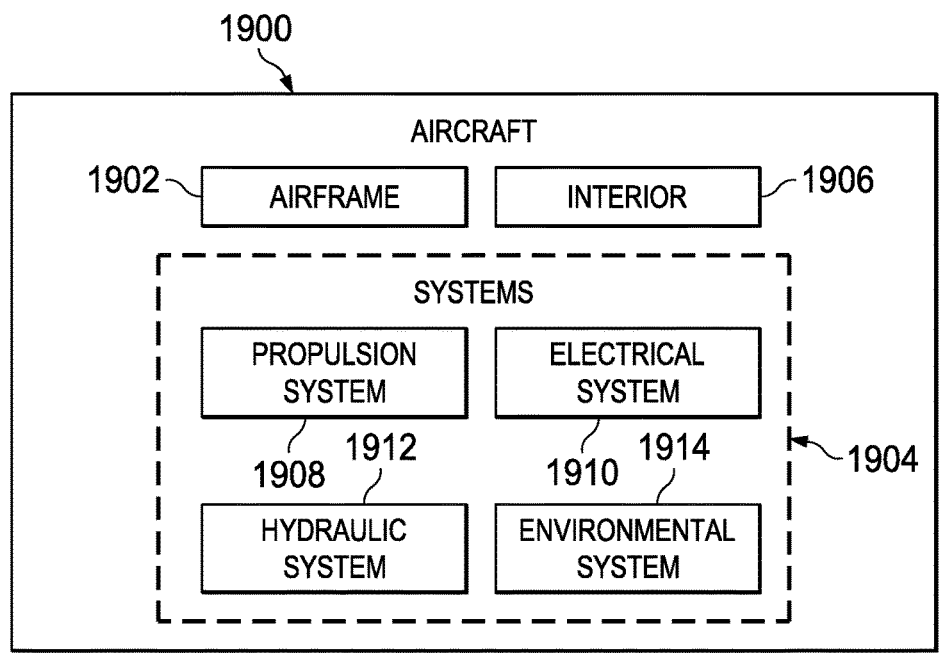
FIG. 19 is an illustration of a block diagram of an aircraft in which an illustrative embodiment may be implemented.

Illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 take place. Thereafter, aircraft 1900 may go through certification and delivery 1810 in order to be placed in service 1812. While in service 1812 by a customer, aircraft 1900 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with a plurality of systems 1904 and interior 1906.

Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18.

One or more apparatus embodiments, method embodiments, or a combination thereof may be utilized while aircraft 1900 is in service 1812, during maintenance and service 1814 in FIG. 18, or both. The use of a number of the different illustrative embodiments may substantially expedite the assembly of aircraft 1900, reduce the cost of aircraft 1900, or both expedite the assembly of aircraft 1900 and reduce the cost of aircraft 1900.

For example, one or more illustrative examples may be used to manufacture parts in the different stages. Further, one or more illustrative examples also may be used to determine the feasibility of using preforms for use in manufacturing parts.

Figure 20:
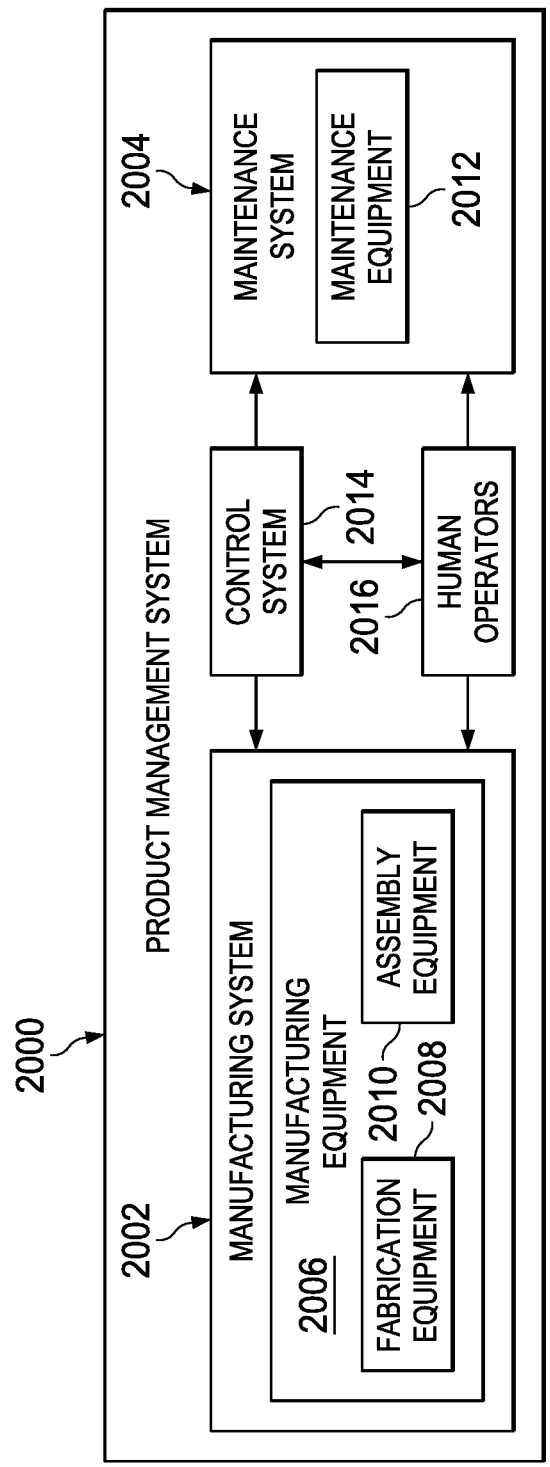
FIG. 20 is an illustration of a block diagram of a product management system in accordance with an illustrative embodiment.

Turning now to FIG. 20, an illustration of a block diagram of a product management system is depicted in accordance with an illustrative embodiment. Product management system 2000 is a physical hardware system. In this illustrative example, product management system 2000 may include at least one of manufacturing system 2002 or maintenance system 2004.

Manufacturing system 2002 is configured to manufacture products, such as aircraft 1900 in FIG. 19. As depicted, manufacturing system 2002 includes manufacturing equipment 2006. Manufacturing equipment 2006 includes at least one of fabrication equipment 2008 or assembly equipment 2010.

Fabrication equipment 2008 is equipment that may be used to fabricate components for parts used to form aircraft 1900. For example, fabrication equipment 2008 may include machines and tools. These machines and tools may be at least one of a drill, a hydraulic press, a furnace, a mold, a composite tape laying machine, a vacuum system, a lathe, or other suitable types of equipment. Fabrication equipment 2008 may be used to fabricate at least one of metal parts, composite parts, semiconductors, circuits, fasteners, ribs, skin panels, spars, antennas, or other suitable types of parts.

Assembly equipment 2010 is equipment used to assemble parts to form aircraft 1900. In particular, assembly equipment 2010 may be used to assemble components and parts to form aircraft 1900. Assembly equipment 2010 also may include machines and tools. These machines and tools may be at least one of a robotic arm, a crawler, a faster installation system, a rail-based drilling system, or a robot. Assembly equipment 2010 may be used to assemble parts such as seats, horizontal stabilizers, wings, engines, engine housings, landing gear systems, and other parts for aircraft 1900.

In this illustrative example, maintenance system 2004 includes maintenance equipment 2012. Maintenance equipment 2012 may include any equipment needed to perform maintenance on aircraft 1900. Maintenance equipment 2012 may include tools for performing different operations on parts on aircraft 1900. These operations may include at least one of disassembling parts, refurbishing parts, inspecting parts, reworking parts, manufacturing replacement parts, or other operations for performing maintenance on aircraft 1900. These operations may be for routine maintenance, inspections, upgrades, refurbishment, or other types of maintenance operations.

In the illustrative example, maintenance equipment 2012 may include ultrasonic inspection devices, x-ray imaging systems, vision systems, drills, crawlers, and other suitable device. In some cases, maintenance equipment 2012 may include fabrication equipment 2008, assembly equipment 2010, or both to produce and assemble parts that may be needed for maintenance. In the illustrative example, part manufacturing system 102 in FIG. 1 may be implemented within at least one of manufacturing system 2002 or maintenance system 2004.

Product management system 2000 also includes control system 2014. Control system 2014 is a hardware system and may also include software or other types of components. Control system 2014 is configured to control the operation of at least one of manufacturing system 2002 or maintenance system 2004.

In particular, control system 2014 may control the operation of at least one of fabrication equipment 2008, assembly equipment 2010, or maintenance equipment 2012. In the illustrative example, part manager 116 in FIG. 1 may be implemented as part of control system 2014 or may be in communication with control system 2014.

The hardware in control system 2014 may be using hardware that may include computers, circuits, networks, and other types of equipment. The control may take the form of direct control of manufacturing equipment 2006. For example, robots, computer-controlled machines, and other equipment may be controlled by control system 2014.

In other illustrative examples, control system 2014 may manage operations performed by human operators 2016 in manufacturing or performing maintenance on aircraft 1900 in FIG. 19. For example, control system 2014 may assign tasks, provide instructions, display models, or perform other operations to manage operations performed by human operators 2016. In these illustrative examples, part manager 116 in FIG. 1 and FIG. 2 may be implemented in control system 2014 to manage at least one of the manufacturing or maintenance of aircraft 1900 in FIG. 19.

In the different illustrative examples, human operators 2016 may operate or interact with at least one of manufacturing equipment 2006, maintenance equipment 2012, or control system 2014. This interaction may be performed to manufacture aircraft 1900.

Of course, product management system 2000 may be configured to manage other products other than aircraft 1900. Although aircraft management system 2000 has been described with respect to manufacturing in the aerospace industry, aircraft management system 2000 may be configured to manage products for other industries. For example, aircraft management system 2000 may be configured to manufacture products for the automotive industry as well as any other suitable industries.

Thus, the illustrative embodiments provide a method and apparatus for managing the manufacturing preforms and parts from preforms. As described above, one or more of the illustrative examples provide a method and apparatus that overcome a technical problem with the time and effort needed to create a preform design.

In the illustrative examples, a part manager automatically generates a preform design from parameters for a part design and a number of additional parameters used in manufacturing the preform. The part manager allows for changes to the preform design to be performed more quickly than with currently used techniques.

Further, the part manager generates the preform design without needing the human operator to modify the part design displayed on a graphical user interface. By eliminating the need for this operation, the preform design may be generated more quickly and accurately as compared to currently used techniques.

The output generated by the part manager may be used to evaluate the preform design. For example, the output may include at least one of a visualization of the preform design or evaluation information. This information may be used by at least one of the part manager, the human operator, or some other entity in determining whether a changed preform design is needed. Further, the output may be used to determine whether the parts are suitable for manufacturing through the use of a preform created by an additive manufacturing system, such as a wire based additive manufacturing system.

The description of the different illustrative embodiments has been presented for purposes of illustration and description and is not intended to be exhaustive or limited to the embodiments in the form disclosed. The different illustrative examples describe components that perform actions or operations.

In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a part manager that identifies parameters for a part, wherein said parameters include dimensions for the part and parameters relating to suitable machining techniques, and wherein the part manager is configured to:
identify a number of additional parameters used in manufacturing the part from a preform, wherein said number of additional parameters is selected from at least one of a build direction, a substrate location, a substrate thickness, an additive material offset, a plate excess, a substrate excess, a material density, an additive layer thickness, or a plate thickness, and wherein the part manager is able to change any of the particular additional parameters used in order to meet a number goals;
automatically generate a preform design for the preform using the parameters for the part and the number of additional parameters, wherein the number of additional parameters is information used in creating the preform design for the preform, wherein the preform design enables manufacturing the preform using an additive manufacturing system;
apply a policy on manufacturing parts to the preform design, wherein said policy includes a number of rules relating to weight, cost, and tolerances used in determining whether a preform is suitable for use in manufacturing the part;
determine whether to use the additive manufacturing system to manufacture the preform based on an application of the policy to the preform design; and
repeat identifying the number of additional parameters for manufacturing the part from the preform; and automatically generating the preform design for the preform using the parameters for the part and the number of additional parameters for manufacturing the part from the preform until the preform design meets the number of goals.

2. The apparatus of claim 1, wherein the part manager is further configured to display the preform on a display system using the preform design, wherein the part manager repeats identifying, by a computer system, the number of additional parameters used in manufacturing the part from the preform; and automatically generating, by the computer system, the preform design for the preform using the parameters for the part and the number of additional parameters using changes to the number of additional parameters.

3. The apparatus of claim 1, wherein the part manager is further configured to identify a weight for the preform and a cost estimate for the preform using the weight.

4. The apparatus of claim 1, wherein the part manager is further configured to manufacture the preform using the preform design.

5. The apparatus of claim 4, wherein, in manufacturing the preform using the preform design, the part manager is further configured to generate instructions for the additive manufacturing system using the preform design and the number of additional parameters, wherein the instructions are used by the additive manufacturing system to form the preform for the part.

6. The apparatus of claim 5, wherein the part manager is further configured to order a machining system to machine the preform to form the part.

7. The apparatus of claim 5, wherein the instructions are selected from at least one of commands, program code, source code, or machine code.

8. The apparatus of claim 1, wherein the additive manufacturing system is selected from at least one of further comprises one of an electron beam additive manufacturing system, a powder based electron beam additive manufacturing system, a wire based electron beam additive manufacturing system, a laser additive manufacturing system, a selective heat sintering system, a laser sintering system, or a fusion deposition modeling system.

9. A method for managing a part, the method comprising:
identifying, by a computer system, parameters for the part, wherein said parameters include dimensions for the part and parameters relating to suitable machining techniques;
identifying, by the computer system, a number of additional parameters used in manufacturing the part from a preform, wherein said number of additional parameters is selected from at least one of a build direction, a substrate location, a substrate thickness, an additive material offset, a plate excess, a substrate excess, a material density, an additive layer thickness, or a plate thickness, and wherein the computer system is able to change any of the particular additional parameters used in order to meet a number goals; and automatically generating, by the computer system, a preform design for the preform using the parameters for the part and the number of additional parameters, wherein the number of additional parameters is information used in creating the preform design for the preform, wherein the preform design enables manufacturing the preform using an additive manufacturing system in a manufacturing environment;

applying, by the computer system, a policy on manufacturing parts to the preform design, wherein said policy includes a number of rules relating to weight, cost, and tolerances used in determining whether a preform is suitable for use in manufacturing the part;

determining, by the computer system, whether to use the additive manufacturing system to manufacture the preform based on an application of the policy to the preform design; and repeating identifying, by the computer system, the number of additional parameters for manufacturing the part from the preform; and automatically generating, by the computer system, the preform design for the preform using the parameters for the part and the number of additional parameters for manufacturing the part from the preform until the preform design meets the number of goals.

10. The method of claim 9 further comprising:
repeating identifying, by the computer system, the number of additional parameters for manufacturing the part from the preform; and
automatically generating, by the computer system, the preform design for the preform using the parameters for the part and the number of additional parameters for manufacturing the part from the preform until the preform design meets a number of goals.

11. The method of claim 9 further comprising:
displaying the preform on a display system using the preform design, and further comprising:
repeating identifying, by the computer system, the number of additional parameters used in manufacturing the part from the preform and automatically generating, by the computer system, the preform design for the preform using the parameters for the part and the number of additional parameters, using changes to the number of additional parameters.

12. The method of claim 9 further comprising:
applying a policy on manufacturing parts to the preform design; and
determining whether to use the additive manufacturing system to manufacture the preform based on an application of the policy to the preform design.

13. The method of claim 9 further comprising:
identifying a weight for the preform; and
identifying a cost estimate for the preform using the weight.

14. The method of claim 9 further comprising:
manufacturing the preform using the preform design.

15. The method of claim 14, wherein manufacturing the preform using the preform design comprises:
generating, by the computer system, instructions for the additive manufacturing system using the preform design and the number of additional parameters, wherein the instructions are used by the additive manufacturing system to form the preform for the part; and
manufacturing the preform using the instructions and the additive manufacturing system.

16. The method of claim 15 further comprising:
machining the preform to form the part.

17. The method of claim 15, wherein the instructions are selected from at least one of commands, program code, source code, or machine code.

18. The method of claim 9, wherein the additive manufacturing system is selected from at least one of an electron beam additive manufacturing system, a powder based electron beam additive manufacturing system, a wire based electron beam additive manufacturing system, a laser additive manufacturing system, a selective heat sintering system, a laser sintering system, or a fusion deposition modeling system.

19. The method of claim 9, wherein the parameters also include at least one of materials, processes, inspection information, tolerances, manufacturing excesses, finishing operations, grain direction, and making techniques about the part.

20. The method of claim 9 further comprising:
manufacturing the part; and
installing the part into an aircraft as part of manufacturing the aircraft.

21. A preform management system comprising:
a part manager that identifies parameters for a part, wherein said parameters include dimensions for the part and parameters relating to suitable machining techniques; identifies a number of additional parameters for manufacturing the part from a preform, wherein said number of additional parameters is selected from at least one of a build direction, a substrate location, a substrate thickness, an additive material offset, a plate excess, a substrate excess, a material density, an additive layer thickness, or a plate thickness, and wherein the part manager is able to change any of the particular additional parameters used in order to meet a number goals; generates a preform design for the preform, wherein the number of additional parameters is information used in creating the preform design for the preform, repeats identifying the number of additional parameters for manufacturing the part from the preform; automatically generates the preform design for the preform using the parameters for the part and the number of additional parameters for manufacturing the part from the preform until the preform design meets the number of goals, wherein said desired goals correspond to the feasibility and cost for manufacturing the preform; wherein in performing operations, the part manager is adapted to change the number of additional parameters; displays the preform design on a display system; and outputs feasibility information about the preform, wherein the preform design enables manufacturing the preform using an additive manufacturing system.

22. The preform management system of claim 21, wherein the feasibility information is selected from at least one of a weight or an amount of material needed to form the preform.

23. The preform management system of claim 21, wherein the part manager controls manufacturing of the preform using the preform design.

24. The preform management system of claim 23, wherein in controlling manufacturing of the preform using the preform design, the part manager generates instructions for the additive manufacturing system using the preform design and the number of additional parameters and sends the instructions for the additive manufacturing system, wherein the instructions are used by the additive manufacturing system to form the preform for the part and controls manufacturing of the preform using the instructions and the additive manufacturing system.

* * * * *